(12) United States Patent
Ozeki

(10) Patent No.: US 12,199,537 B2
(45) Date of Patent: Jan. 14, 2025

(54) MOTOR CONTROL SYSTEM, DRIVE UNIT AND ELECTRIC VEHICLE

(71) Applicant: YAMAHA HATSUDOKI KABUSHIKI KAISHA, Iwata (JP)

(72) Inventor: Wataru Ozeki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 181 days.

(21) Appl. No.: 18/127,818

(22) Filed: Mar. 29, 2023

(65) Prior Publication Data
US 2023/0318504 A1    Oct. 5, 2023

(30) Foreign Application Priority Data
Mar. 31, 2022    (JP) .................... 2022-059079

(51) Int. Cl.
*H02P 23/18*    (2016.01)
*A61G 5/04*    (2013.01)
*B60K 26/02*    (2006.01)
*B60L 15/20*    (2006.01)
*G05G 5/03*    (2008.04)
(Continued)

(52) U.S. Cl.
CPC ............. *H02P 23/183* (2016.02); *A61G 5/04* (2013.01); *B60K 26/02* (2013.01); *B60L 15/20* (2013.01); *G05G 5/03* (2013.01); *G05G 5/04* (2013.01); *G05G 5/05* (2013.01); *H02P 23/20* (2016.02); *B60K 2026/025* (2013.01);
(Continued)

(58) Field of Classification Search
CPC ......... H02P 23/183; H02P 23/20; A61G 5/04; B60K 26/02; B60K 2026/025; B60L 15/20; B60L 2200/34; B60L 2240/421; G05G 5/03; G05G 5/04; G05G 5/05; G05G 2505/00
USPC ......................................................... 318/489
See application file for complete search history.

(56) References Cited

U.S. PATENT DOCUMENTS

2003/0034242 A1*  2/2003  Mori .................... H01H 3/3015
                                                                200/400
2013/0213749 A1*  8/2013  Li .......................... B62B 9/082
                                                                188/156

FOREIGN PATENT DOCUMENTS

EP    1 288 762 B1    3/2010
JP    10-165452 A     6/1998

OTHER PUBLICATIONS

Nakai et al. (JP 2005198450 A) Motor Controller Date Published Jul. 21, 2005 (Year: 2005).*
(Continued)

*Primary Examiner* — Jorge L Carrasquillo
(74) *Attorney, Agent, or Firm* — Keating & Bennett, LLP

(57) ABSTRACT

A motor control system for use in an electric vehicle includes an accelerator lever operable by a user, a controller configured or programmed to control an electric motor to generate a drive power to drive the electric vehicle, wherein a rotation speed of the electric motor is increased in response to an increase in a first rotation angle in a first rotation direction of the accelerator lever from a reference position of the accelerator lever, and a first torsion spring including a coil portion inside of which a rotation shaft of the accelerator lever extends to apply a first elastic force in a second rotation direction opposite to the first rotation direction. The controller is configured or programmed to perform a control to
(Continued)

stop the electric motor upon detecting that the first rotation angle is equal to or greater than a first predetermined rotation angle.

16 Claims, 25 Drawing Sheets

(51) Int. Cl.
    *G05G 5/04*     (2006.01)
    *G05G 5/05*     (2006.01)
    *H02P 23/20*     (2016.01)

(52) U.S. Cl.
    CPC ..... *B60L 2200/34* (2013.01); *B60L 2240/421* (2013.01); *G05G 2505/00* (2013.01)

(56) References Cited

OTHER PUBLICATIONS

Nagata (JP 2000255397 A) Parking Brake Device Date Published Sep. 19, 2000 (Year: 2000).*
Birmanns (EP 1288762 A2) Operating Element For Driving Device Date Published Mar. 5, 2003 (Year: 2003).*
Alber, "E-FIX User Manual", Aug. 2, 2016, 46 pages.

* cited by examiner

FIG.6
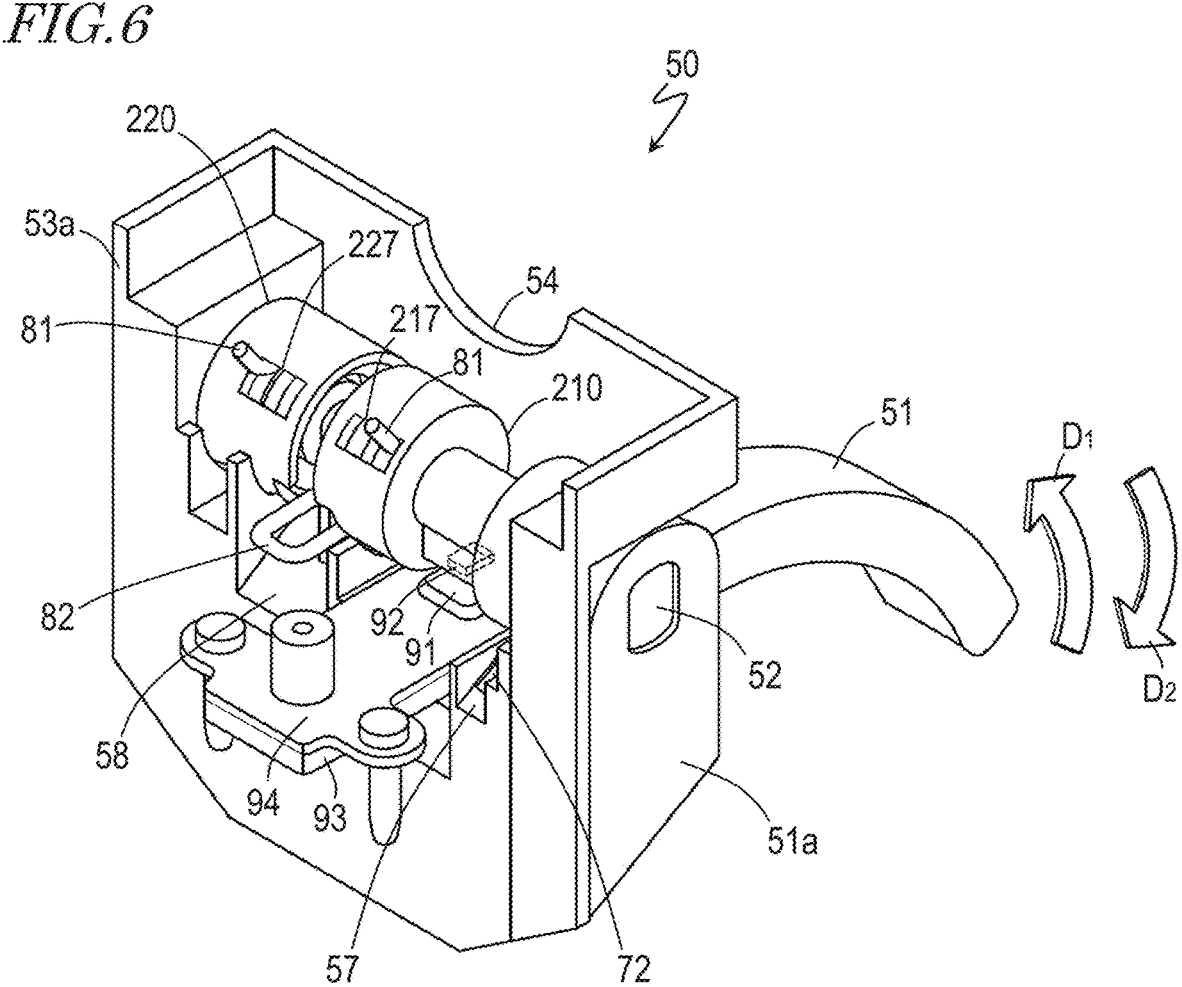
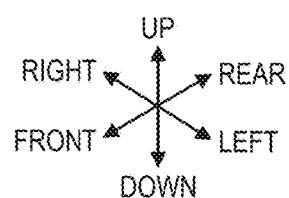

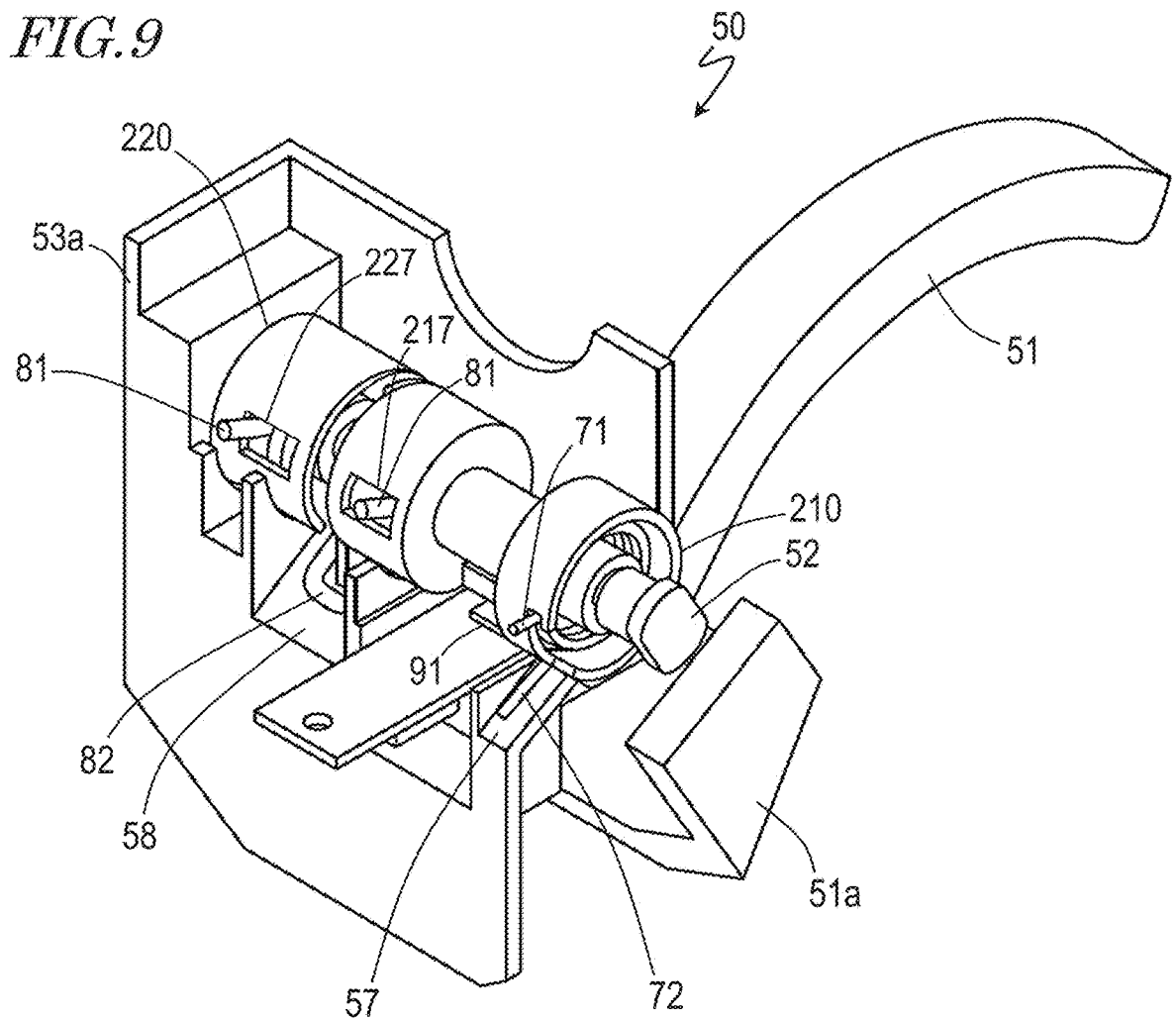
FIG.9
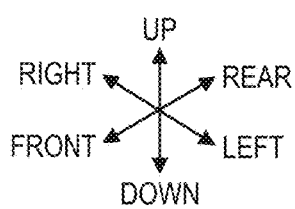

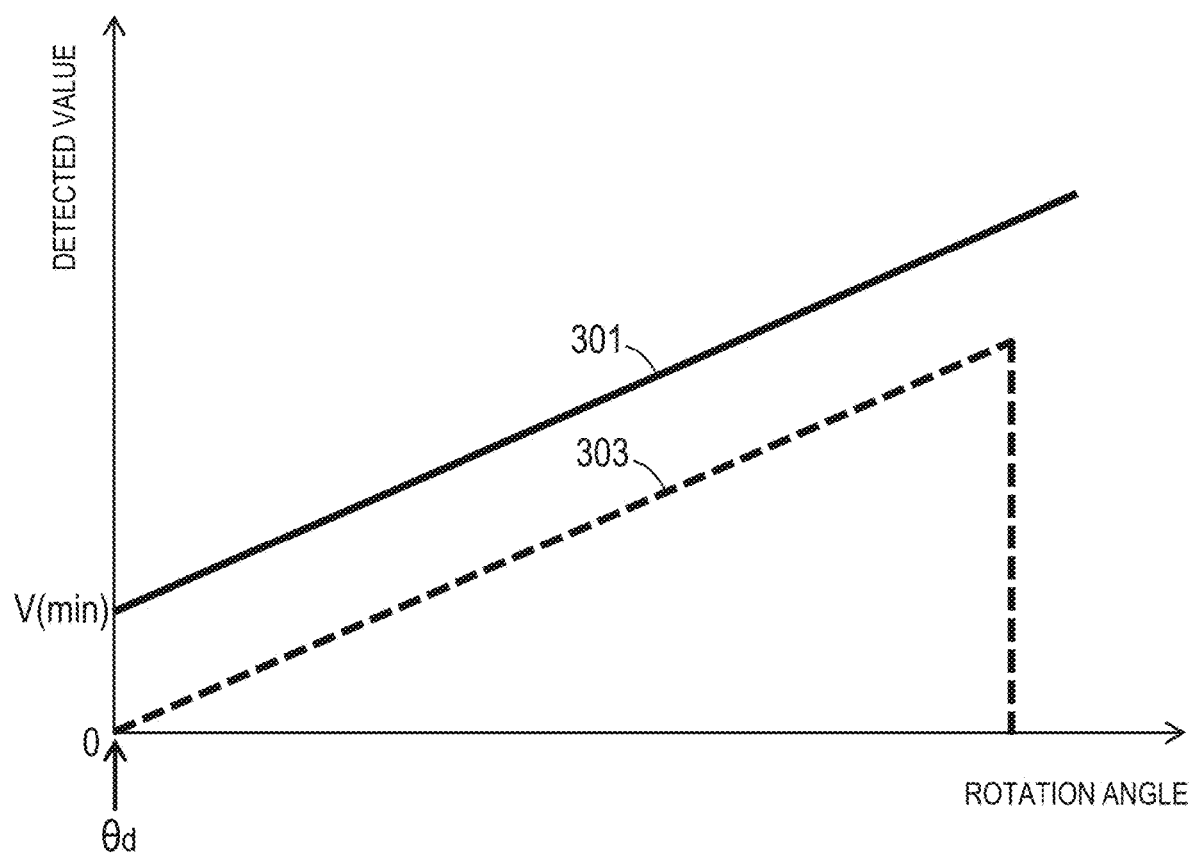

MOTOR CONTROL SYSTEM, DRIVE UNIT AND ELECTRIC VEHICLE

CROSS REFERENCE TO RELATED APPLICATIONS

This application claims the benefit of priority to Japanese Patent Application No. 2022-059079 filed on Mar. 31, 2022. The entire contents of this application are hereby incorporated herein by reference.

BACKGROUND OF THE INVENTION

1. Field of the Invention

The present invention relates to a motor control system, a drive unit and an electric vehicle.

2. Description of the Related Art

Electric wheelchairs are known as one of the electric vehicles that run by using an electric motor as a drive source. The rotation of the electric motor is transmitted to the wheels, thus enabling an electric wheelchair to run. Some models of electric wheelchairs use an electric motor to assist human hands pedaling the handrims.

Japanese Laid-Open Patent Publication No. 10-165452 discloses an electric wheelchair including a switch to turn ON/OFF the rotation of the electric motor provided on a handle that is held by the hand of the caregiver. The caregiver turns the switch ON to rotate the electric motor, thus enabling the electric wheelchair to run. The caregiver turns the switch OFF to stop the electric motor, thus stopping the electric wheelchair.

SUMMARY OF THE INVENTION

There is a demand for further improving the convenience for the user to operate an electric vehicle such as an electric wheelchair.

A motor control system according to a preferred embodiment of the present invention includes an accelerator lever operated by a user, a housing to rotatably support the accelerator lever, an angle sensor to output a signal in accordance with a rotation angle of the accelerator lever, a controller configured or programmed to control an electric motor to generate a drive power to drive the electric vehicle, and to perform a control such that a rotation speed of the electric motor is increased in response to an increase in a first rotation angle, which is a rotation angle in a first rotation direction of the accelerator lever from a reference position of the accelerator lever, and a first torsion spring including a coil portion inside of which a rotation shaft of the accelerator lever extends to apply a first elastic force in a second rotation direction in an opposite direction to the first rotation direction to the accelerator lever, wherein the controller is configured or programmed to perform a control to stop the electric motor upon detecting that the first rotation angle is equal to or greater than a first predetermined rotation angle.

According to a preferred embodiment of the present invention, the electric motor is stopped when the first rotation angle of the accelerator lever is equal to or greater than the first predetermined rotation angle. The user can stop the electric motor by simply increasing the amount of operation of the accelerator lever. The user can stop the electric vehicle without returning the accelerator lever to the reference position (e.g., the neutral position), thus improving the convenience for the user.

The first torsion spring is used as an elastic member to generate a force in the direction of returning the accelerator lever to the reference position. By passing the rotation shaft of the accelerator lever through the coil portion of the first torsion spring, the space is shared between the first torsion spring and the rotation shaft, thus reducing the space to be reserved to accommodate the elastic member. Thus, it is possible to increase the degree of freedom in arranging the other components of the motor control system, and also to reduce the size of the motor control system.

In a preferred embodiment of the present invention, the motor control system further includes a second torsion spring including a coil portion inside of which the rotation shaft of the accelerator lever extends to apply a second elastic force in the second rotation direction to the accelerator lever, wherein a second predetermined rotation angle is a predetermined value greater than 0 degrees and less than the first predetermined rotation angle, and the second torsion spring does not apply the second elastic force to the accelerator lever when the first rotation angle is less than the second predetermined rotation angle, and applies the second elastic force to the accelerator lever when the first rotation angle is equal to or greater than the second predetermined rotation angle.

When the first rotation angle of the accelerator lever is equal to or greater than the second predetermined rotation angle, the second torsion spring applies the second elastic force to the accelerator lever, thus rapidly increasing the magnitude of the force required for the user to move the accelerator lever. This prevents the electric motor from stopping when the first rotation angle becomes equal to or greater than the first predetermined rotation angle against the intention of the user.

The first predetermined rotation angle at which the electric motor is stopped is greater than the second predetermined rotation angle at which the second torsion spring starts to apply the second elastic force to the accelerator lever. By not stopping the electric motor at the second predetermined rotation angle, it is possible to prevent the electric motor from stopping against the intention of the user.

As described above, when the first rotation angle of the accelerator lever is equal to or greater than the second predetermined rotation angle, the magnitude of the force required for the user to move the accelerator lever increases rapidly. Thus, the user can recognize that the operation position of the accelerator lever at which the electric motor stops is close. If the user does not wish to stop the electric vehicle, the user can continue to drive the electric vehicle by not moving the accelerator lever further in the first rotation direction. If the user wishes to stop the electric vehicle, the user can stop the electric motor by moving the accelerator lever further in the first rotation direction.

The second torsion spring is used as an elastic member to apply the second elastic force to the accelerator lever when the first rotation angle is equal to or greater than the second predetermined rotation angle. By extending the rotation shaft of the accelerator lever through the inside of the coil portion of the second torsion spring, the space can be shared between the second torsion spring and the rotation shaft, thus reducing the space to be reserved to accommodate the elastic member. Thus, it is possible to increase the degree of freedom in arranging other components of the motor control system, and also to reduce the size of the motor control system.

In a preferred embodiment of the present invention, the spring constant of the second torsion spring may be greater than the spring constant of the first torsion spring.

It is possible to increase the second elastic force applied by the second torsion spring to the accelerator lever, and to prevent the first rotation angle from becoming equal to or greater than the first predetermined rotation angle and stopping the electric motor against the intention of the user.

For example, by increasing the wire diameter of the wire material of the second torsion spring or by using a harder wire material, it is possible to increase the spring constant of the second torsion spring while keeping the size of the second torsion spring small.

In a preferred embodiment of the present invention, the second torsion spring includes a first arm portion and a second arm portion extending from the coil portion of the second torsion spring, and the motor control system further includes a support provided on the rotation shaft of the accelerator lever to support the first arm portion so that the first arm portion moves in conjunction with rotation of the accelerator lever, and a stopper to limit a range of movement of the second arm portion in conjunction with the rotation of the accelerator lever, and the stopper does not contact the second arm portion when the first rotation angle is less than the second predetermined rotation angle, and contacts the second arm portion thus limiting movement of the second arm portion in conjunction with the rotation of the accelerator lever when the first rotation angle is equal to or greater than the second predetermined rotation angle.

When the first rotation angle of the accelerator lever is equal to or greater than the second predetermined rotation angle, the second elastic force can be applied from the second torsion spring to the accelerator lever.

In a preferred embodiment of the present invention, the support supports the first arm portion and the second arm portion with the second torsion spring twisted by a predetermined amount in advance in a direction in which the second torsion spring twists in response to the rotation of the accelerator lever in the first rotation direction.

By twisting the second torsion spring by a predetermined amount in advance, a large elastic force can be applied to the accelerator lever from the stage where the second torsion spring starts to apply the second elastic force to the accelerator lever. Thus, it is possible to rapidly increase the magnitude of the force required for the user to move the accelerator lever.

In a preferred embodiment of the present invention, a magnitude of a torque for the first rotation angle to exceed the second predetermined rotation angle is about 10 to about 12 times greater than a torque for the first rotation angle to be the second predetermined rotation angle.

By rapidly increasing the magnitude of the torque for the first rotation angle to exceed the second predetermined rotation angle, it is possible to prevent the electric motor from stopping against the intention of the user.

In a preferred embodiment of the present invention, the motor control system may further include a fastener to prevent misalignment between the rotation shaft of the accelerator lever and the support in the rotation direction of the accelerator lever.

It is possible to prevent misalignment between the rotation shaft of the accelerator lever and the second torsion spring supported by the support, and the magnitude of the first rotation angle at which the second torsion spring starts applying the second elastic force to the accelerator lever can be made constant.

In a preferred embodiment of the present invention, the second torsion spring is a double torsion spring, the double torsion spring includes two coil portions arranged side by side along a first direction (the left-right direction); the double torsion spring includes two arm portions extending from opposite end portions of the double torsion spring in the first direction that corresponds to one of the first arm portion and the second arm portion, and the other arm portion of the first arm portion and the second arm portion is located between the two coil portions in the first direction and links together the two coil portions.

By using a double torsion spring including two coil portions as the second torsion spring, it is possible to increase the second elastic force applied to the accelerator lever. Since the stress applied to the second torsion spring can be distributed between the two coil portions, it is possible to increase the durability of the second torsion spring even when the second elastic force is large.

In a preferred embodiment of the present invention, the first predetermined rotation angle is about 2 degrees to about 5 degrees greater than the second predetermined rotation angle.

The electric motor is stopped when the first rotation angle becomes equal to the first predetermined rotation angle, which is slightly larger than the second predetermined rotation angle at which the second torsion spring starts to apply the second elastic force to the accelerator lever. By not stopping the electric motor when the first rotation angle becomes equal to the second predetermined rotation angle, it is possible to prevent the electric motor from stopping against the intention of the user.

In a preferred embodiment of the present invention, the second predetermined rotation angle may be about 20 degrees or more and about 30 degrees or less.

The accelerator lever can be rotated over an angular range for which the user can easily adjust the travel speed of the electric vehicle.

In a preferred embodiment of the present invention, the motor control system further includes a magnet to move in conjunction with rotation of the accelerator lever, wherein the angle sensor may be a magnetic sensor, and may be supported by the housing so as not to move in conjunction with the rotation of the accelerator lever.

By using a magnetic sensor, the rotation angle of the accelerator lever can be detected with high accuracy. By using a non-contact magnetic sensor, it is possible to enhance the durability of the angle sensor.

The durability of the angle sensor can be enhanced by providing the angle sensor with an extended electric wire so that it does not move in conjunction with the rotation of the accelerator lever.

In a preferred embodiment of the present invention, the base portion of the accelerator lever may be connected to opposite end portions of the rotation shaft.

The first torsion spring and the second torsion spring can be arranged in the region enclosed by the base portion of the accelerator lever.

The neutral position of the accelerator lever can be defined in the rotation direction of the accelerator lever as the base portion of the accelerator lever contacts the housing.

In a preferred embodiment of the present invention, the housing may include a hole through which the handlebar of the electric vehicle is to penetrate.

Where the motor control system is installed on the electric vehicle afterwards, it is possible to maintain the position of the grip originally intended on the electric vehicle, and the user can operate the accelerator lever while holding the grip.

A drive unit according to a preferred embodiment of the present invention includes the motor control system described above, and the electric motor to generate a drive power to drive the electric vehicle.

By installing the drive unit on the electric vehicle, it is possible to improve the convenience of the user.

An electric vehicle according to a preferred embodiment of the present invention includes the drive unit described above.

Thus, it is possible to provide an electric vehicle that is highly convenient for the user.

In a preferred embodiment of the present invention, the electric vehicle may be an electric wheelchair.

Thus, it is possible to provide an electric wheelchair that is highly convenient for the caregiver.

According to a preferred embodiment of the present invention, the electric motor is stopped when the first rotation angle of the accelerator lever is equal to or greater than the first predetermined rotation angle. The user can stop the electric motor by simply increasing the amount of operation of the accelerator lever. The user can stop the electric vehicle without returning the accelerator lever to the reference position (e.g., the neutral position), thus improving the convenience for the user.

The first torsion spring is used as an elastic member to generate a force in the direction of returning the accelerator lever to the reference position. By passing the rotation shaft of the accelerator lever through the coil portion of the first torsion spring, the space can be shared between the first torsion spring and the rotation shaft, thus reducing the space to be reserved to accommodate the elastic member. Thus, it is possible to increase the degree of freedom in arranging the other components of the motor control system, and also to reduce the size of the motor control system.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is a perspective view showing a portion of the inside of the operation unit 50 according to a preferred embodiment of the present invention.

FIG. 9 is a perspective view showing the operation unit 50 when the first rotation angle $\theta_1$ of the accelerator lever 51 is a predetermined rotation angle $\theta_a$ according to a preferred embodiment of the present invention.

FIG. 25 is a graph showing the control in which the detected value 301 when the first rotation angle $\theta_1$ is 0 degrees is set to V (min) according to a preferred embodiment of the present invention.

DETAILED DESCRIPTION OF THE PREFERRED EMBODIMENTS

Preferred embodiments of the present invention will now be described with reference to the drawings. Like elements will be denoted by like reference signs, and description thereof will be omitted where it is redundant. In the detailed description, front, rear, up, down, left and right refer to these directions as viewed from the occupant seated in the seat of the electric vehicle. The following preferred embodiments are merely examples, and the present invention is not limited to the following preferred embodiments.

The electric vehicle according to a preferred embodiment is, for example, an electric wheelchair. The electric vehicle is not limited to an electric wheelchair, but may be any vehicle that runs on an electric motor as a drive source. For example, the electric vehicle may be a PLEV (Personal Light Electric Vehicle). For example, the electric vehicle may be an electric kickboard. An electric kickboard may also be referred to as an "e-scooter" or an electric kick-skater. The electric vehicle according to a preferred embodiment may be, for example, an electric low-speed vehicle with its maximum speed limited to a relatively low speed. The maximum speed may be limited to, for example, about 20 km/h or less. For example, the maximum speed of an electric wheelchair may be limited to about 6 km/h. The value of the maximum speed is an example, and the preferred embodiments of the present invention are not limited thereto. In the description of the following preferred embodiments, an electric wheelchair will be illustrated as an example of the electric vehicle.

Figure 1:
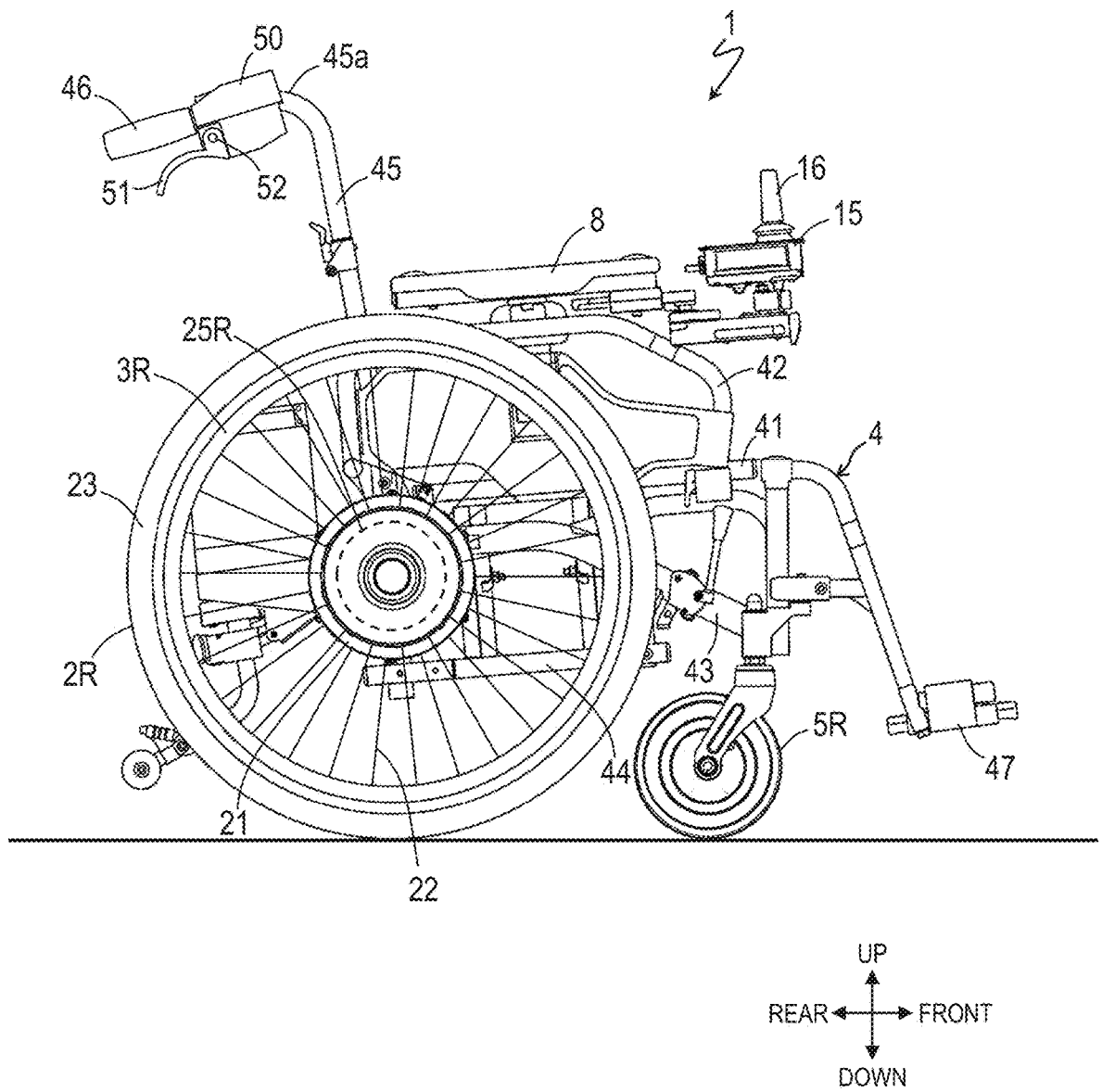
FIG. 1 is a right side view showing an electric wheelchair 1 according to a preferred embodiment of the present invention.
Figure 2:
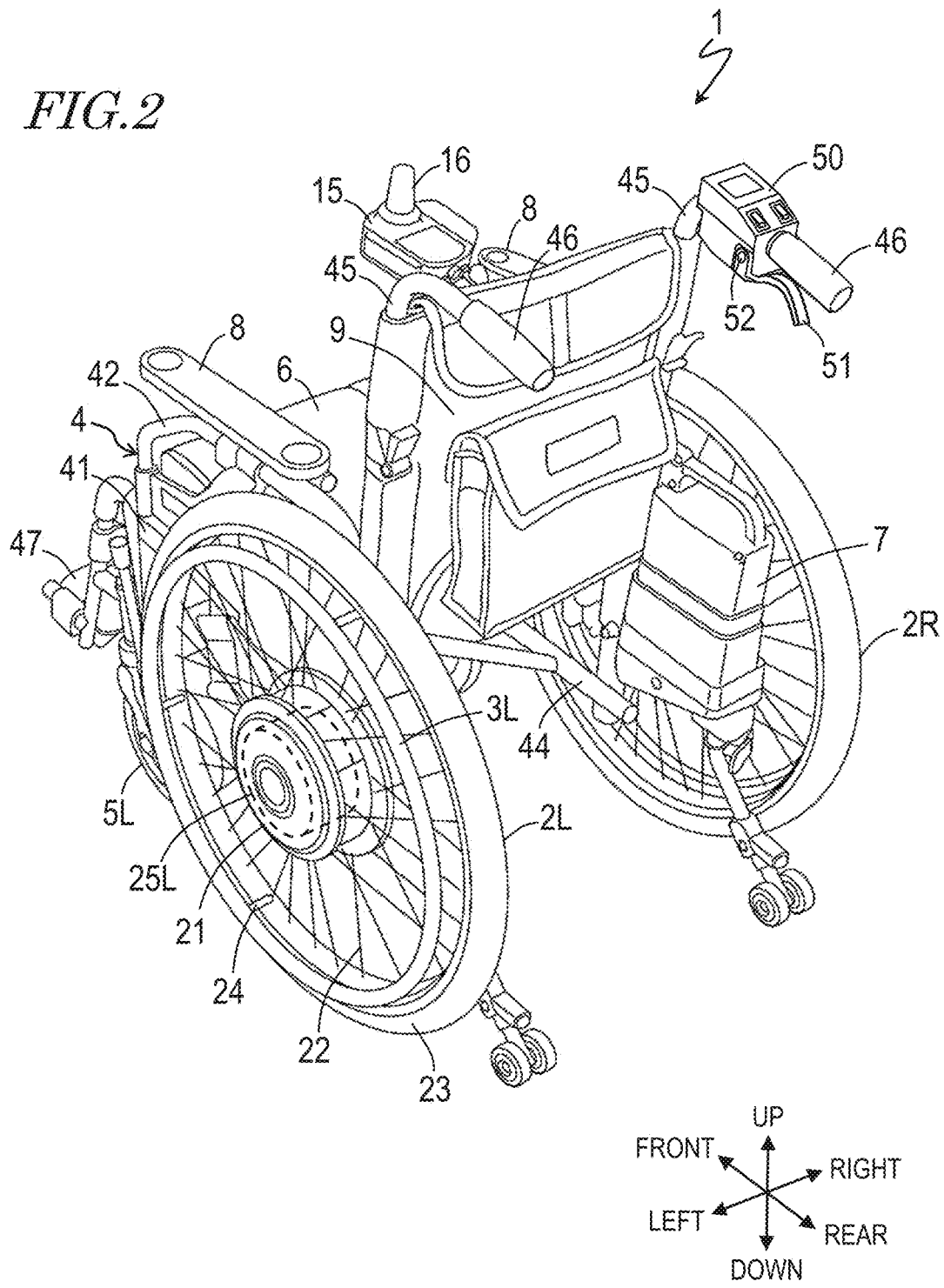
FIG. 2 is a perspective view showing the electric wheelchair 1 according to a preferred embodiment of the present invention.

FIG. 1 is a right side view showing an electric wheelchair 1 according to a preferred embodiment of the present invention. FIG. 2 is a perspective view showing the electric wheelchair 1 as viewed from a diagonal left-rear direction.

The electric wheelchair 1 includes a vehicle body frame 4 made of a metal pipe, or the like. A pair of left and right wheels 2L and 2R and a pair of left and right casters 5L and 5R are rotatably supported on the vehicle body frame 4. The vehicle body frame 4 includes a pair of left and right seat frames 41, a pair of left and right armrest frames 42, a pair of left and right base frames 43, a pair of left and right under frames 44, and a pair of left and right back frames 45.

A seat 6 on which a person is seated is provided between the pair of left and right seat frames 41. Front portions of the seat frames 41 are bent in the downward direction, and a footrest 47 is provided at the lower ends of the front portions of the seat frames 41. The rear ends of the seat frames 41 are connected to the back frames 45. The back frames 45 extend in the up-down direction. A backrest 9 is provided between the pair of left and right back frames 45. FIG. 1 does not show the backrest 9 so that the shape of the back frames 45 can be easily understood.

The back frames 45 include handlebars 45a that are bent in the backward direction at the top thereof. Handgrips 46 to be held by the hands of the caregiver are provided on the handlebars 45a.

The base frames 43 and under frames 44 are arranged downward of the seat frames 41. The armrest frames 42 are arranged upward of the seat frames 41. Armrests 8 on which to rest the arms of the person who is seated in the seat 6 are provided on the armrest frames 42.

A handrim 3L to drive the wheel 2L by human power is provided on the wheel 2L. A handrim 3R to drive the wheel 2R by human power is provided on the wheel 2R. The wheels 2L and 2R each include a wheel hub 21, a peripheral portion 23 surrounding the wheel hub 21, and a plurality of spokes 22. The plurality of spokes 22 connect together the wheel hub 21 and the peripheral portion 23. The peripheral portion 23 includes a rim to which the spokes 22 are connected, and a tire attached to the rim. The handrims 3L and 3R are connected to a plurality of connecting members 24 that extend from the peripheral portion 23 of the wheels 2L and 2R.

An electric motor 25L is provided in the wheel hub 21 of the wheel 2L. An electric motor 25R in the wheel hub 21 of the wheel 2R. The electric motors 25L and 25R are hub motors, for example. The wheel hub 21 includes an axle, a first housing located on the inner side in the left-right direction of the electric wheelchair 1, and a second housing located on the outer side. The first housing on the inner side is fixed to the axle, and the second housing on the outer side is rotatable about the axle. The stators of the electric motors 25L and 25R are fixed to the first housing and the axle, and the rotors of the electric motors 25L and 25R are fixed to the second housing. The plurality of spokes 22 are connected to the second housing.

The axle of the wheel hub 21 is fixed to the vehicle body frame 4. The axle of the wheel hub 21 is fixed to the back frame 45, for example. The axle of the wheel hub 21 may be fixed to the vehicle body frame 4 via a bracket provided between the seat frame 41 and the under frame 44. The second housing rotates relative to the axle and the first housing fixed to the vehicle body frame 4, thus rotating the wheels 2L and 2R.

A battery 7 to supply electric power to the electric motors 25L and 25R is installed on the electric wheelchair 1. As electric power is supplied to the electric motors 25L and 25R, the rotors fixed to the second housings rotate relative to the stators fixed to the first housings, thus rotating the wheels 2L and 2R.

The electric motors 25L and 25R are not limited to hub motors, and may be provided outside the wheel hubs 21. In this case, the rotation generated by the electric motors 25L and 25R can be transmitted to the wheel hubs 21 via a decelerator.

An operation unit 15 used by the person seated in the seat 6 to operate the electric wheelchair 1 is provided in a front portion of the armrest 8. The operation unit 15 includes a stick 16, for example a joystick, and when a stick 16 of the operation unit 15 is tilted by hand, the electric motors 25L and 25R generate rotation to drive the electric wheelchair 1. It is possible to adjust the travel speed by adjusting the degree to which a stick 16 is tilted. When the stick 16 is returned to the neutral position, the electric motors 25L and 25R stop and the electric wheelchair 1 can be stopped.

An operation unit 50 used by the caregiver to operate the electric wheelchair 1 is provided on the handlebar 45a of one of the pair of left and right back frames 45. The operation unit 50 includes an accelerator lever 51 rotatable about a rotation shaft 52. When the caregiver grips the accelerator lever 51 together with the handgrip 46, the accelerator lever 51 rotates about the rotation shaft 52. In response to this operation by the caregiver, the electric motors 25L and 25R generate rotation, thus driving the electric wheelchair 1. It is possible to adjust the travel speed by adjusting the degree to which the accelerator lever 51 is gripped, i.e., the magnitude of the rotation angle of the accelerator lever 51. When the accelerator lever 51 is returned to the neutral position, the electric motors 25L and 25R stop and the electric wheelchair 1 can be stopped.

Next, the drive unit of the electric wheelchair 1 will be described.

Figure 3:
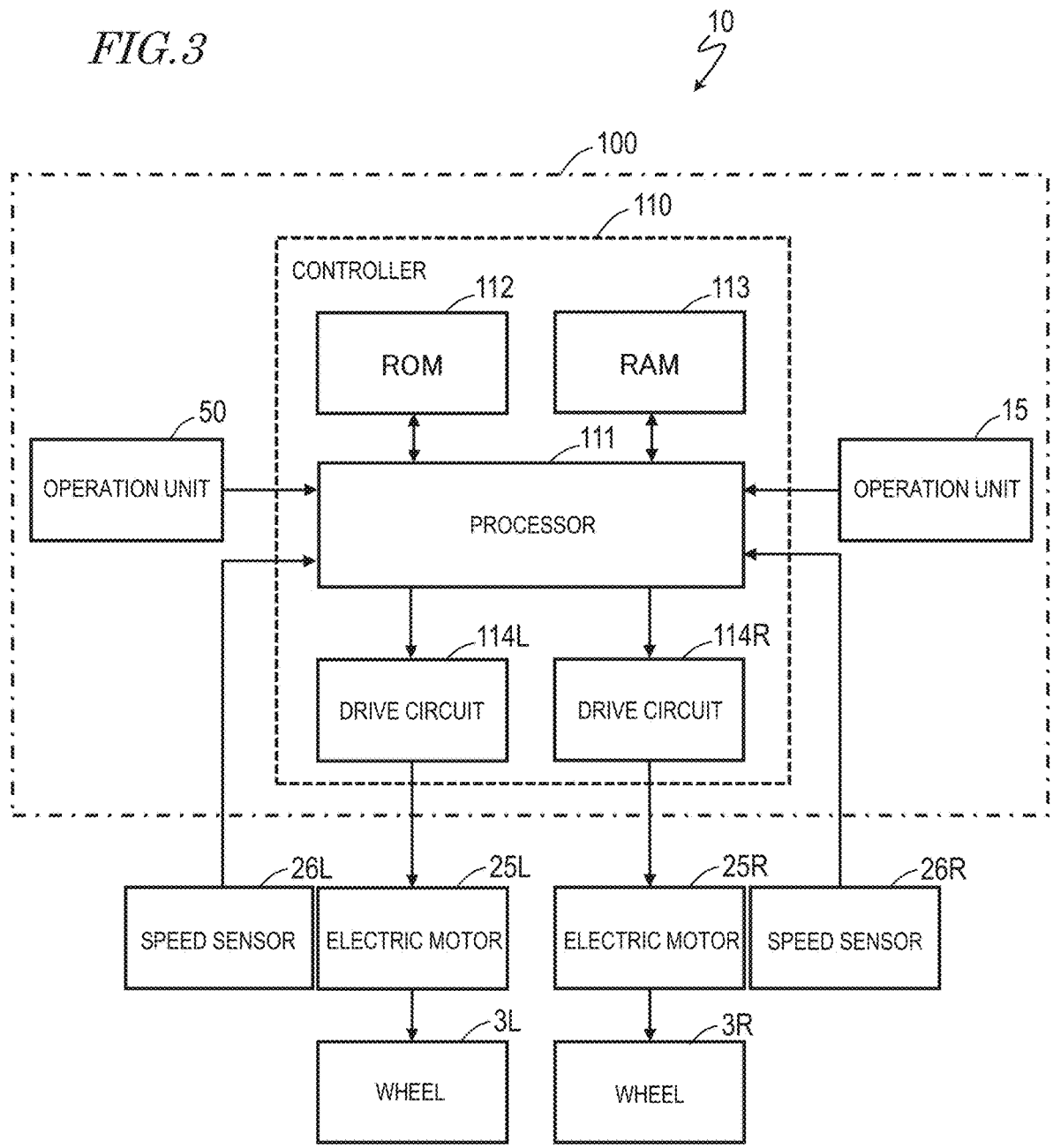
FIG. 3 is a block diagram showing a drive unit 10 of the electric wheelchair 1 according to a preferred embodiment of the present invention.

FIG. 3 is a block diagram showing the drive unit 10 of the electric wheelchair 1. The battery 7 (FIG. 2) supplies electric power to the drive unit 10. The drive unit 10 generates drive power to the electric motors 25L and 25R in response to an operation on the operation units 15 and 50.

The drive unit 10 includes a motor control system 100, the electric motors 25L and 25R, speed sensors 26L and 26R and the wheels 2L and 2R. The motor control system 100 includes a controller 110 and the operation units 15 and 50.

The controller 110 includes a processor 111, a storage medium such as a ROM (Read Only Memory) 112 and a RAM (Random Access Memory) 113, and drive circuits 114L and 114R. The ROM 112 stores a computer program (or firmware) to cause the processor 111 to execute processes. The computer program can be provided to the drive unit 10 via a storage medium (e.g., a semiconductor memory) or a telecommunication line (e.g., the Internet). Such a computer program may be sold as commercial software.

The processor 111 may be a semiconductor integrated circuit, and includes a central processing unit (CPU), for example. The processor 111 may be realized by a microprocessor or a microcontroller. The processor 111 sequentially executes a computer program (the computer program stored in the ROM 112) that describes a set of instructions for executing various processes, thus performing the desired processes.

The processor 111 may be an FPGA (Field Programmable Gate Array) with a CPU, a GPU (Graphics Processing Unit), an ASIC (Application Specific Integrated Circuit), an ASSP (Application Specific Standard Product), or a combination of two or more circuits selected from among these circuits.

The ROM 112 is, for example, a writable memory (e.g., a PROM), a rewritable memory (e.g., a flash memory), or a read-only memory. The ROM 112 does not need to be a single storage medium, but may be an aggregate of multiple storage mediums. The RAM 113 provides a work area for the computer program stored in the ROM 112 to be extracted upon booting up. The RAM 113 does not need to be a single storage medium, but may be an aggregate of multiple storage mediums.

The drive circuits 114L and 114R may be inverters, for example. The drive circuits 114L and 114R generate drive current in accordance with the current command value output from the processor 111, and supply the drive current to the electric motors 25L and 25R.

The speed sensor 26L is provided on the electric motor 25L. The speed sensor 26R is provided on the electric motor 25R. The speed sensors 26L and 26R are encoders, for example. The speed sensor 26L detects the rotation angle of the rotor of the electric motor 25L to output a signal corresponding to the rotation angle to the controller 110. The speed sensor 26R detects the rotation angle of the rotor of electric motor 25R to output a signal corresponding to the rotation angle to the controller 110.

The controller 110 can be provided on the wheel hub 21 of the wheel 2L or the wheel 2R. The components of the controller 110 may be distributed between the wheel hub 21 of the wheel 2L and the wheel hub 21 of the wheel 2R. For example, the drive circuit 114L may be arranged in the wheel hub 21 of the wheel 2L and the drive circuit 114R may be arranged in the wheel hub 21 of the wheel 2R. The controller 110 may be provided independent of the wheel hub 21.

The processor 111 of the controller 110 calculates the rotation speed of the electric motors 25L and 25R from output signals of the speed sensors 26L and 26R. The tire size of the wheels 2L and 2R is known in advance, and the processor 111 can calculate the travel speed of the electric wheelchair 1 from the rotation speed of the electric motors 25L and 25R. Where the rotation of the electric motors 25L and 25R is transmitted to the wheels 2L and 2R via a decelerator, the travel speed of the electric wheelchair 1 is calculated by further using information on the deceleration ratio of the decelerator.

The speed sensors 26L and 26R may be provided on the wheel hubs 21, the peripheral portions 23 or the spokes 22 of the wheels 2L and 2R. The speed sensors 26L and 26R may output signals in accordance with the rotation of the parts on which they are provided.

The operation unit 15 outputs a signal to the controller 110 in response to an operation on the stick 16 by a human seated in the seat 6. The operation unit 50 outputs a signal to the controller 110 in response to an operation on the accelerator lever 51 by the caregiver.

The processor 111 calculates the target value of the rotation speed of the electric motors 25L and 25R based on the output signal from the operation unit 15 or the operation unit 50. For example, the processor 111 calculates the target value of the rotation speed by referring to a map showing the relationship between the amount of operation of the stick 16 of the operation unit 15 and the accelerator lever 51 of the operation unit 50 and the rotation speed of the electric motors 25L and 25R.

The processor 111 calculates the current rotation speed of the electric motors 25L and 25R from the output signals of the speed sensors 26L and 26R, and calculates the current command value such as to reduce the deviation between the current rotation speed and the target value.

The processor 111 outputs the calculated current command value to the drive circuits 114L and 114R. The drive circuits 114L and 114R generate a drive current in accordance with the current command value and supply the drive current to the electric motors 25L and 25R. The electric motors 25L and 25R to which the drive current is supplied generate rotation. By performing a feedback control so as to reduce the deviation between the current rotation speed of the electric motors 25L and 25R and the target value, it is possible to drive the electric wheelchair 1 at a travel speed in accordance with the amount of operation on the operation unit 15 or the operation unit 50. The drive unit 10 can be attachable/detachable to/from the vehicle body frame 4 of the electric wheelchair 1. The drive unit 10 may also be attachable/detachable to/from to a vehicle body frame different from the vehicle body frame 4. For example, a common wheelchair can be used as the electric wheelchair 1 by detaching the wheels from the vehicle body frame of the common wheelchair and attaching the drive unit 10 to the vehicle body frame.

The drive unit 10 does not need to include the wheels 2L and 2R. In this case, the drive unit 10 is attached to a wheelchair including wheels and handrims.

The motor control system 100 does not need to include the operation unit 15. In this case, the electric motors 25L and 25R are driven by the caregiver operating the operation unit 50.

Next, the details of the operation unit 50 will be described.

Figure 4:
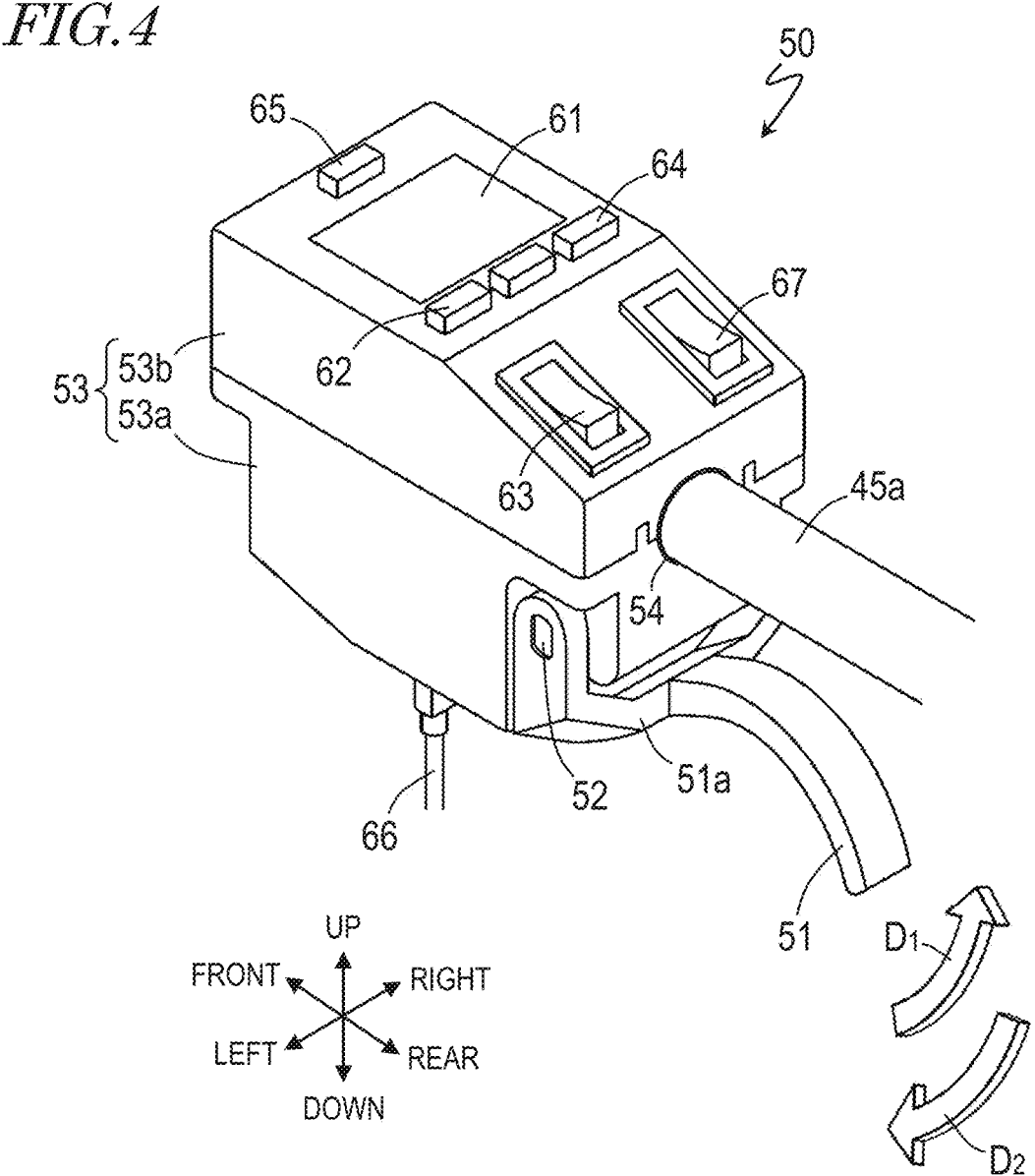
FIG. 4 is a perspective view showing an operation unit 50 according to a preferred embodiment of the present invention.

FIG. 4 is a perspective view showing the operation unit 50 as viewed from a diagonal left-rear direction. The operation unit 50 includes the accelerator lever 51 to be operated by the caregiver, and a housing 53 that rotatably supports the accelerator lever 51. A base portion 51*a* of the accelerator lever 51 is attached to the rotation shaft 52. The housing 53 rotatably supports the rotation shaft 52, thus rotatably supporting the accelerator lever 51. The housing 53 includes a display panel 61, a power switch 62, a mode selection switch 63, an operation switch 64, a forward/reverse selection switch 67, and an indicator 65.

Figure 5:
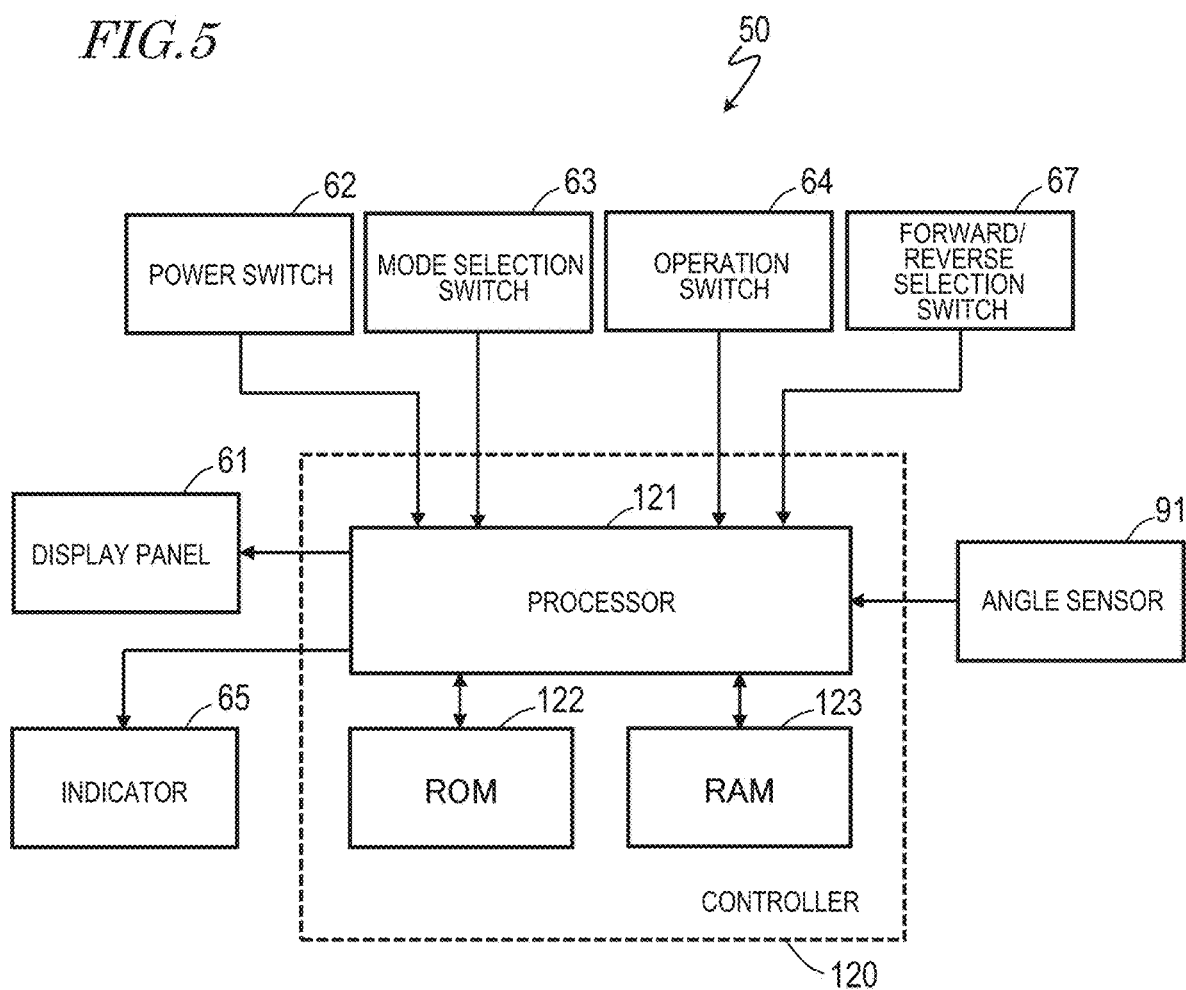
FIG. 5 is a block diagram showing a hardware configuration of the operation unit 50 according to a preferred embodiment of the present invention.

FIG. 5 is a block diagram showing the hardware configuration of the operation unit 50. The operation unit 50 further includes a controller 120 and an angle sensor 91.

The controller 120 includes a processor 121, a ROM 122 and a RAM 123. The description of the processor 121, the ROM 122 and the RAM 123 is redundant with the description of the processor 111, the ROM 112 and the RAM 113 of the controller 110, and will therefore be omitted here. The processor 121 controls the operation of the operation unit 50. The angle sensor 91 outputs a signal corresponding to the rotation angle of the accelerator lever 51.

The housing 53 includes a first housing 53*a* and a second housing 53*b*. The first housing 53*a* and the second housing 53*b* fit together to define a space to house various components. The first housing 53*a* and the second housing 53*b* can be fixed to each other using fasteners such as bolts or an adhesive, for example. The controller 120 can send and receive signals to and from the controller 110, etc., via a wire 66 extending from the first housing 53*a* to the outside.

The power switch 62 is a switch to turn ON/OFF the power supply of the electric wheelchair 1. The drive unit 10 is operative when the power supply of the electric wheelchair 1 is ON, and the drive unit 10 is inoperative when the power supply is OFF. When the power switch 62 is operated by the caregiver while the power supply is OFF, the power supply is turned ON, and when the power switch 62 is operated by the caregiver while the power supply is ON, the power supply is turned OFF.

The mode selection switch 63 is a switch to select a desired travel mode from among a plurality of travel modes in which the maximum speed of the electric wheelchair 1 differs from each other. When the caregiver operates the mode selection switch 63, the processor 121 sends a signal corresponding to the operation to the controller 110. The processor 111 of the controller 110 sets the travel mode in accordance with the received signal. The caregiver can select the desired travel mode by operating the mode selection switch 63.

The forward/reverse selection switch 67 is used to switch between the forward travel and the reverse travel of the electric wheelchair 1. When the caregiver operates the forward/reverse selection switch 67 to select the forward travel or the reverse travel, the processor 121 sends a signal indicating the forward travel or the reverse travel to the controller 110. When a signal indicating the forward travel is received, the processor 111 controls the electric motors 25L and 25R so that the electric wheelchair 1 travels forward. When a signal indicating the reverse travel is received, the processor 111 controls the electric motors 25L and 25R so that the electric wheelchair 1 travels backward.

The display panel 61 displays various information in response to operations on the operation unit 50 by the caregiver. The display panel 61 is, for example, a liquid crystal panel. The processor 121 causes the display panel 61 to display information such as the remaining battery capacity, the possible travel distance, the currently selected travel mode, and whether or not the electric wheelchair 1 has any abnormalities. A display panel other than a liquid crystal panel, such as an OLED (Organic Light-Emitting Diode) panel or an electronic paper panel, may be used as the display panel 61. The caregiver can operate the operation switch 64 to change what is displayed on the display panel 61, etc.

When there is information of which the caregiver should be informed, the processor 121 uses the indicator 65 to inform the caregiver. The indicator 65 is, for example, a sound-generating component that emits a sound and/or a lamp that emits light. The sound-generating component is, for example, but not limited to, a buzzer or a speaker. The processor 121 activates the indicator 65 when, for example, the remaining capacity of the battery 7 is low or the electric wheelchair 1 has an abnormality. As the indicator 65 emits a sound or light, the caregiver can easily recognize that the remaining capacity of the battery 7 is low or that an abnormality has occurred. The processor 121 also displays, on the display panel 61, information of which the caregiver should be informed. In this case, the display may be emphasized by causing the display panel 61 to emit light or to blink what is displayed.

The housing 53 includes holes 54 through which the handlebar 45*a* penetrates. The holes 54 are provided in a front portion and a rear portion of the housing 53 so that the handlebar 45*a* can penetrate through the housing 53. For ease of understanding, the handgrip 46 is not shown in FIG. 4. In the present preferred embodiment, the operation unit 50 is attached to the handlebar 45*a* while the handlebar 45*a* penetrates through the operation unit 50. Thus, when the operation unit 50 is installed on the wheelchair afterwards, it is possible to maintain the position of the handgrip 46 originally intended on the wheelchair. The caregiver can operate the accelerator lever 51 while holding the handgrip 46 maintained in the position suitable for operating the wheelchair.

Figure 7:
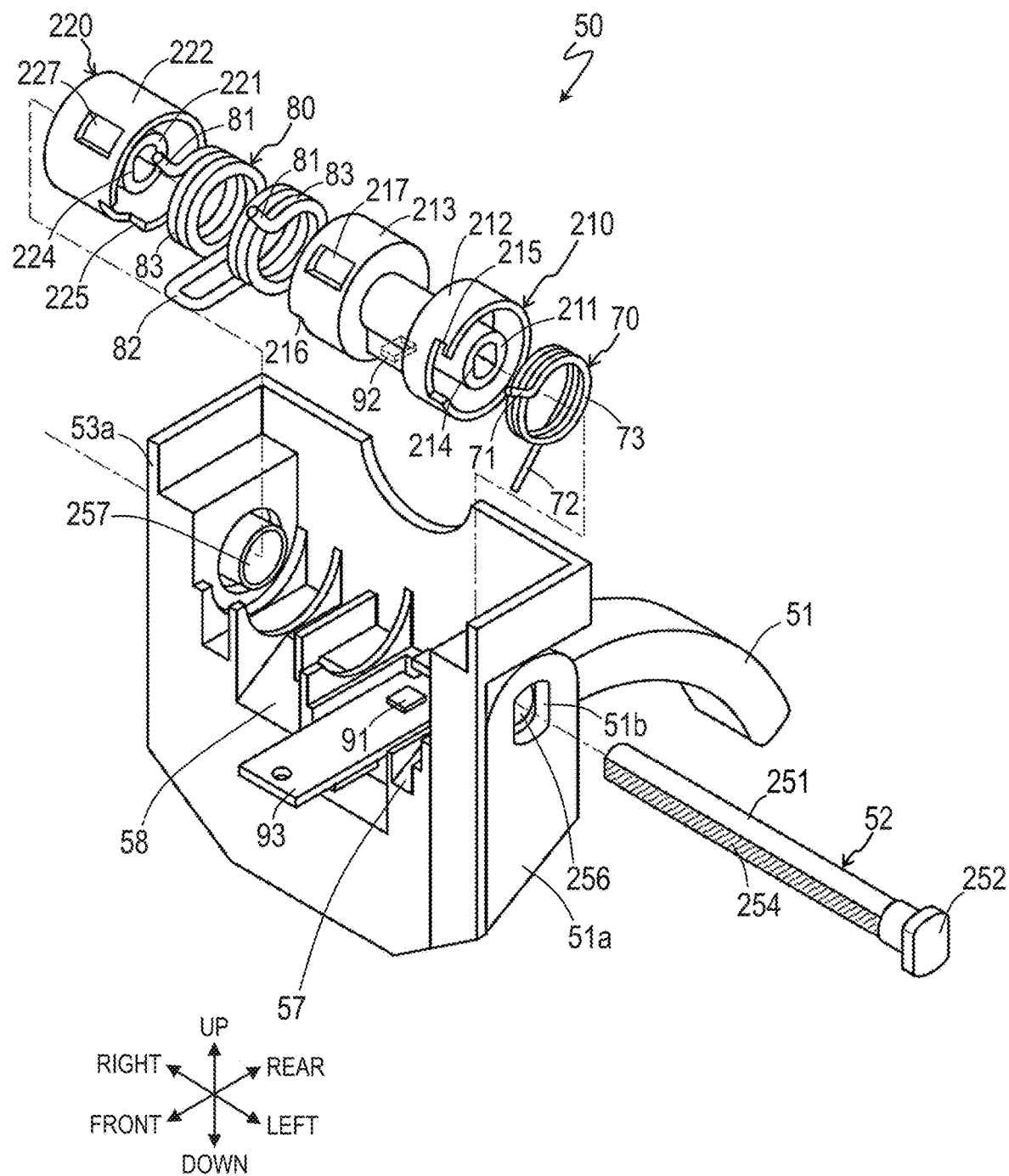
FIG. 7 is an exploded perspective view showing a plurality of components of the operation unit 50 according to a preferred embodiment of the present invention.

Next, the mechanism related to the rotational movement of the accelerator lever 51 will be described. FIG. 6 is a perspective view showing a portion of the inside of the operation unit 50 as viewed from a diagonal left-front direction. FIG. 7 is an exploded perspective view showing a plurality of components of the operation unit 50.

The left side wall and the right side wall of the first housing 53*a* include holes 256 and 257 through which the rotation shaft 52 of the accelerator lever 51 extends. The base portion 51*a* of the accelerator lever 51 includes a hole 51*b* through which the rotation shaft 52 extends, and the left end portion of the base portion 51*a* and the left end portion of the rotation shaft 52 are fixed to each other by a head portion 252 of the rotation shaft 52 fitting in the hole 51*b*. The right end portion of the base portion 51*a* of the accelerator lever 51 and the right end portion of the rotation shaft 52 can be fixed to each other using fasteners such as bolts or nuts.

The operation unit 50 includes a first torsion spring 70, a second torsion spring 80, and support members 210 and 220.

The first torsion spring 70 includes a coil portion 73 and arm portions 71 and 72 extending from the coil portion 73. The second torsion spring 80 includes coil portions 83 and arm portions 81 and 82 extending from the coil portions 83.

In the present preferred embodiment, the second torsion spring 80 is a double torsion spring. The second torsion spring 80, which is a double torsion spring, includes two coil portions 83 arranged side by side along the left-right direction. The two arm portions 81 extend from the opposite end portions of the second torsion spring 80 in the left-right direction. The arm portion 82 is located between the two coil portions 83 in the left-right direction, and links together the two coil portions 83.

The support member 210 supports the arm portion 71 of the first torsion spring 70 and one of the two arm portions 81 of the second torsion spring 80. The support member 210 includes a tubular portion 211 inside of which the rotation shaft 52 extends. The tubular portion 211 extends through the inside of the coil portion 73 of the first torsion spring 70, and extends through the inside of one of the two coil portions 83 of the second torsion spring 80. The support member 210 further includes a tubular portion 212 that covers the outer circumference portion of the coil portion 73 and a tubular portion 213 that covers the outer circumference portion of one of the two coil portions 83. The tubular portions 212 and 213 have a drum shape and their side walls are connected to the outer circumference portion of the tubular portion 211.

The tubular portion 212 includes a notch 215. The arm portion 71 of the first torsion spring 70 fits into the notch 215, such that the arm portion 71 is supported by the support member 210.

A hole 217 is provided in the tubular portion 213. As one of the two arm portions 81 extends through a hole 217 and contacts the inner wall portion of the hole 217, the arm portion 81 is supported by the support member 210.

The support member 220 supports the other one of the two arm portions 81 of the second torsion spring 80. The support member 220 includes a tubular portion 221 inside of which the rotation shaft 52 extends. The tubular portion 221 extends through the inside of the other one of the two coil portions 83 of the second torsion spring 80. The support member 220 further includes a tubular portion 222 that covers the outer circumference portion of the other one of the two coil portions 83. The tubular portion 222 has a drum shape and its side wall is connected to the outer circumference portion of the tubular portion 221.

A hole 227 is provided in the tubular portion 222. As the other one of the two arm portions 81 extends through the hole 227 and contacts the inner wall portion of the hole 227, the arm portion 81 is supported by the support member 220.

A notch 216 is provided in the tubular portion 213 and a notch 225 is provided in the tubular portion 222. As the arm portion 82 of the second torsion spring 80 fits into the notches 216 and 225, the arm portion 82 is supported by the support members 210 and 220.

The rotation shaft 52 and the support members 210 and 220 include a fastening structure that prevents misalignment of the accelerator lever 51 in the rotation direction. As an example, a body portion 251 of the rotation shaft 52 includes a flat portion 254 (the portion shown hatched in FIG. 7) having a flat shape. The inner circumferential wall portions of the tubular portions 211 and 221 include flat portions 214 and 224 having a flat shape that contact the flat portion 254. As the body portion 251 including the flat portion 254 fits into the inner circumferential wall portions including the flat portions 214 and 224, misalignment between the rotation shaft 52 and the support members 210 and 220 is prevented. Note that a keyway, or the like, may be used to prevent misalignment between the rotation shaft 52 and the support members 210 and 220.

The base portion 51a of the accelerator lever 51 is connected to the opposite end portions of the rotation shaft 52. For example, the base portion 51a has a U-letter shape, wherein the left end portion of the U-letter shape is connected to the left end portion of the rotation shaft 52 and the right end portion of the U-letter shape is connected to the right end portion of the rotation shaft 52. By attaching the accelerator lever 51 to the rotation shaft 52 so that the base portion 51a is connected to the opposite end portions of the rotation shaft 52, the first torsion spring 70, the second torsion spring 80 and the support members 210 and 220 can be arranged in the region enclosed by the base portion 51a in the left-right direction.

The first housing 53a is provided with the angle sensor 91 that outputs a signal in accordance with the rotation angle of the accelerator lever 51. The angle sensor 91 is, for example, a magnetic sensor. In the illustrated example, the angle sensor 91 is provided on a substrate 93 arranged in the first housing 53a. The substrate 93 may be provided with a cover 94. A magnet 92, which is a permanent magnet, is provided on the support member 210. The position of the magnet 92 provided on the support member 210 moves in conjunction with the rotation of the accelerator lever 51. The angle sensor 91, which is a magnetic sensor, is provided in the first housing 53a so that it does not move in conjunction with the rotation of the accelerator lever 51. As the accelerator lever 51 rotates, the magnet 92 moves relative to the angle sensor 91 so that the magnetic field applied to the angle sensor 91 changes, thus detecting the rotation angle of the accelerator lever 51.

By using a magnetic sensor as the angle sensor 91, the rotation angle of the accelerator lever 51 can be detected with high accuracy. By using a non-contact magnetic sensor, it is possible to enhance the durability of the angle sensor 91. The durability of the angle sensor 91 can be enhanced by providing the angle sensor 91 with an extended electric wire so that it does not move in conjunction with the rotation of the accelerator lever 51.

The processor 121 of the controller 120 calculates the rotation angle of the accelerator lever 51 using the output signal of the angle sensor 91 and outputs the information of the rotation angle to the controller 110. The calculation of the rotation angle of the accelerator lever 51 using the output signal of the angle sensor 91 may be performed by the processor 111 of the controller 110.

The position of the arm portion 72 of the first torsion spring 70 supported by the support member 210 moves in conjunction with the rotation of the accelerator lever 51. A stopper 57 is provided in the first housing 53a that contacts the arm portion 72 of the first torsion spring 70 to prevent the movement of the arm portion 72. The stopper 57 may be a component of the first housing 53a.

FIG. 6 shows the operation unit 50 when the accelerator lever 51 is in the neutral position. When the caregiver grips the accelerator lever 51 with a hand, the accelerator lever 51 rotates in the first rotation direction $D_1$. The first rotation direction $D_1$ is a counterclockwise direction as the operation unit 50 is viewed in a side view from the left.

The processor 111 of the controller 110 performs a control to increase the rotation speed of the electric motors 25L and 25R in response to an increase in the first rotation angle $\theta_1$ of the accelerator lever 51. The first rotation angle $\theta_1$ is the rotation angle of the accelerator lever 51 in the first rotation direction $D_1$ from the reference position. The reference position of the accelerator lever 51 is, for example, the neutral position.

The first torsion spring 70 applies a first elastic force in the second rotation direction $D_2$, which is the opposite direction to the first rotation direction $D_1$, to the accelerator lever 51. When the caregiver stops operating the accelerator lever 51, the first elastic force of the first torsion spring 70 causes the accelerator lever 51 to rotate in the second rotation direction $D_2$ to return to the neutral position. In the neutral position where the first rotation angle $\theta_1$ is 0 degrees, the processor 111 performs a control to stop the electric motors 25L and 25R.

The first torsion spring 70 applies the first elastic force in the second rotation direction $D_2$ to the accelerator lever 51 in the entire angular range for which the accelerator lever 51 can rotate. Even in the neutral position, the first torsion spring 70 applies the first elastic force to the accelerator lever 51. Thus, the accelerator lever 51 is maintained in the neutral position when not being operated by the caregiver.

At the angle where the accelerator lever 51 is in the neutral position, the front end portion of the base portion 51a contacts the rear portion of the first housing 53a. This prevents further rotation of the accelerator lever 51 in the second rotation direction $D_2$ from the neutral position, and maintains the accelerator lever 51 in the neutral position by the first elastic force of the first torsion spring 70.

The positions of the arm portions 81 and 82 of the second torsion spring 80 supported by the support members 210 and 220 move in conjunction with the rotation of the accelerator lever 51. A stopper 58 is provided in the first housing 53a to limit the range of movement of the arm portion 82 in conjunction with the rotation of the accelerator lever 51. The stopper 58 may be a component of the first housing 53a.

When the first rotation angle $\theta_1$ of the accelerator lever 51 is smaller than the predetermined rotation angle $\theta_a$ (the second predetermined rotation angle), the stopper 58 does not contact the arm portion 82 and does not prevent the movement of the arm portion 82. When the first rotation angle $\theta_1$ is equal to or greater than the predetermined rotation angle $\theta_a$, the stopper 58 contacts the arm portion 82 and prevents the movement of the arm portion 82 in conjunction with the rotation of the accelerator lever 51. The predetermined rotation angle $\theta_a$ is an angle greater than 0 degrees, and is about 20 degrees or more and about 30 degrees or less, but there is no limitation thereto.

When the first rotation angle $\theta_1$ is equal to or greater than the predetermined rotation angle $\theta_a$, the movement of the arm portion 82 is prevented by the stopper 58. Thus, the second torsion spring 80 can apply the second elastic force in the second rotation direction $D_2$ to the accelerator lever 51 when the first rotational angle $\theta_1$ is equal to or greater than the predetermined rotational angle $\theta_a$. The second torsion spring 80 does not apply the second elastic force to the accelerator lever 51 when the first rotation angle $\theta_1$ is smaller than the predetermined rotation angle $\theta_a$. By applying the second elastic force from the second torsion spring 80 to the accelerator lever 51 when the first rotation angle $\theta_1$ is equal to or greater than the predetermined rotation angle $\theta_a$, the size of the force required for the caregiver to move the accelerator lever 51 can be increased.

Figure 8:
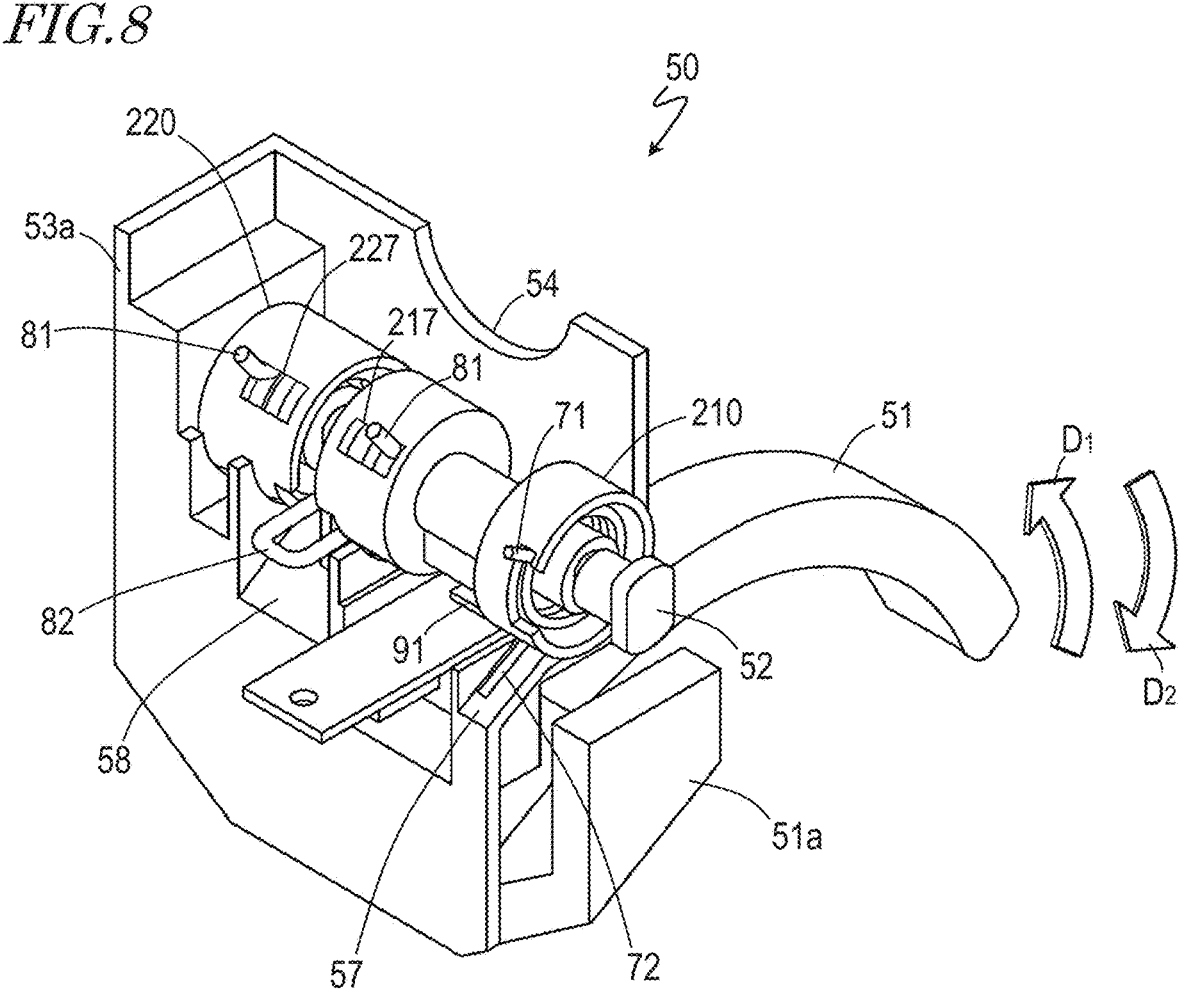
FIG. 8 is a perspective view showing the operation unit 50 when an accelerator lever 51 is in a neutral position according to a preferred embodiment of the present invention.
Figure 10:
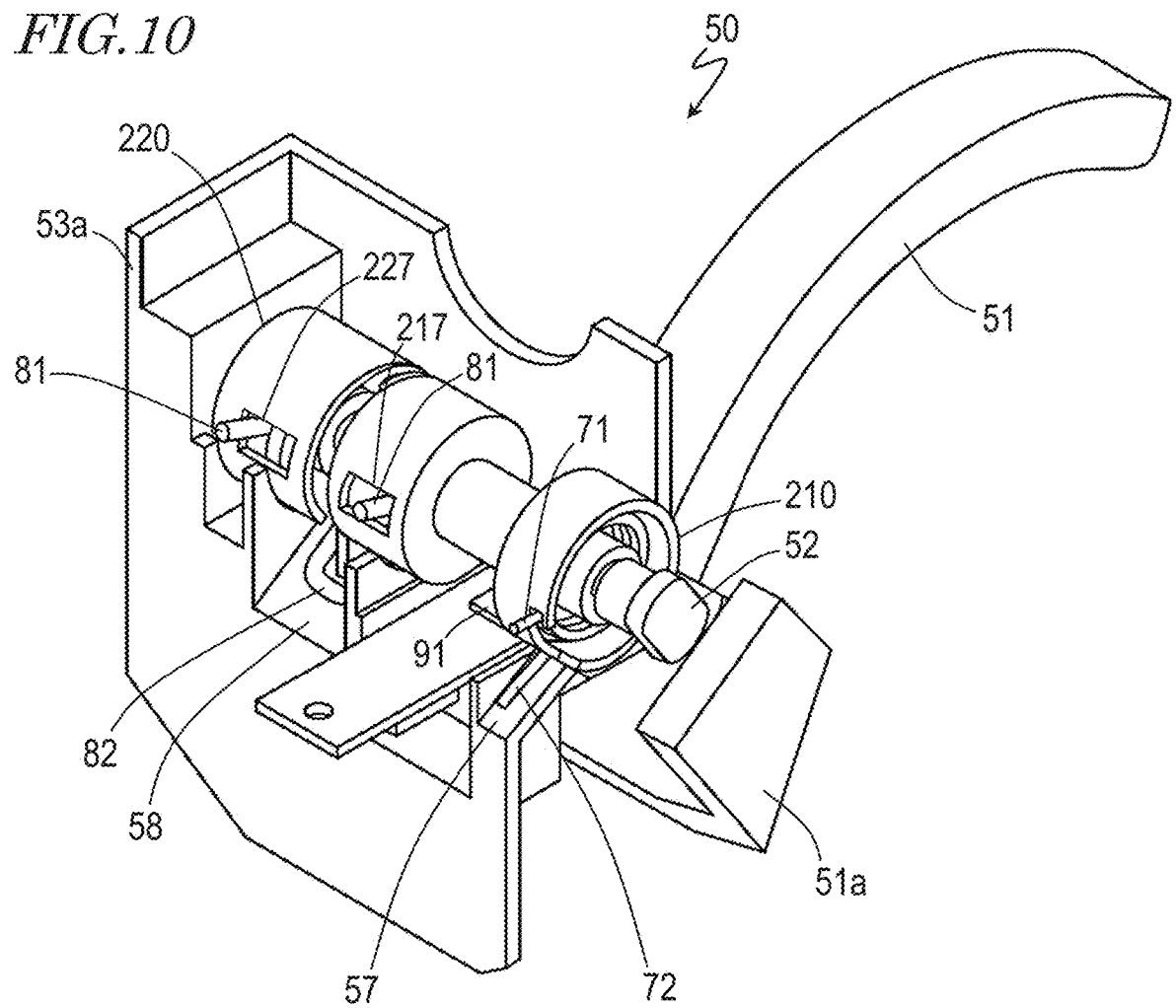
FIG. 10 is a perspective view showing the operation unit 50 when the first rotation angle $\theta_1$ is greater than the predetermined rotation angle $\theta_a$ according to a preferred embodiment of the present invention.

FIG. 8 to FIG. 10 are perspective views showing a portion of the inside of the operation unit 50 as viewed from a diagonal left-front direction. FIG. 8 shows the operation unit 50 when the accelerator lever 51 is in the neutral position. The first rotation angle $\theta_1$ in the neutral position is 0 degrees. FIG. 9 shows the operation unit 50 when the first rotation angle $\theta_1$ of the accelerator lever 51 is at the predetermined rotation angle $\theta_a$. FIG. 10 shows the operation unit 50 when the first rotation angle $\theta_1$ is greater than the predetermined rotation angle $\theta_a$.

Figure 11:
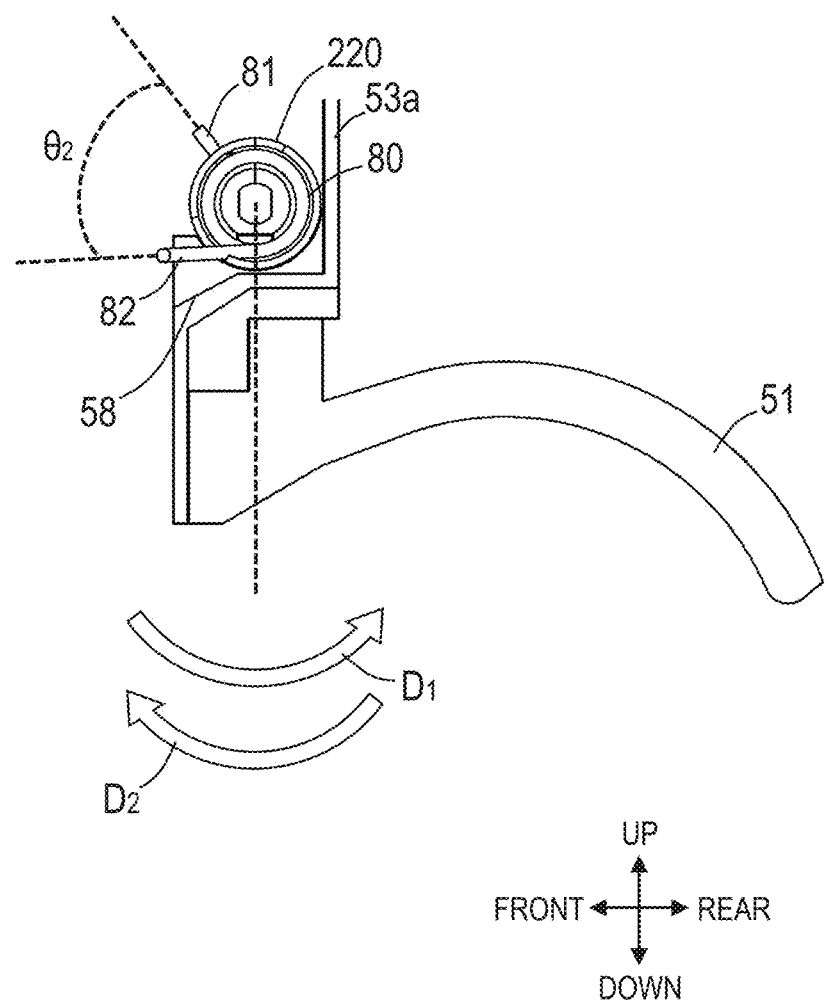
FIG. 11 is a view showing a second torsion spring 80 and a stopper 58 when a first rotation angle $\theta_1$ of the accelerator lever 51 is 0 degrees according to a preferred embodiment of the present invention.
Figure 12:
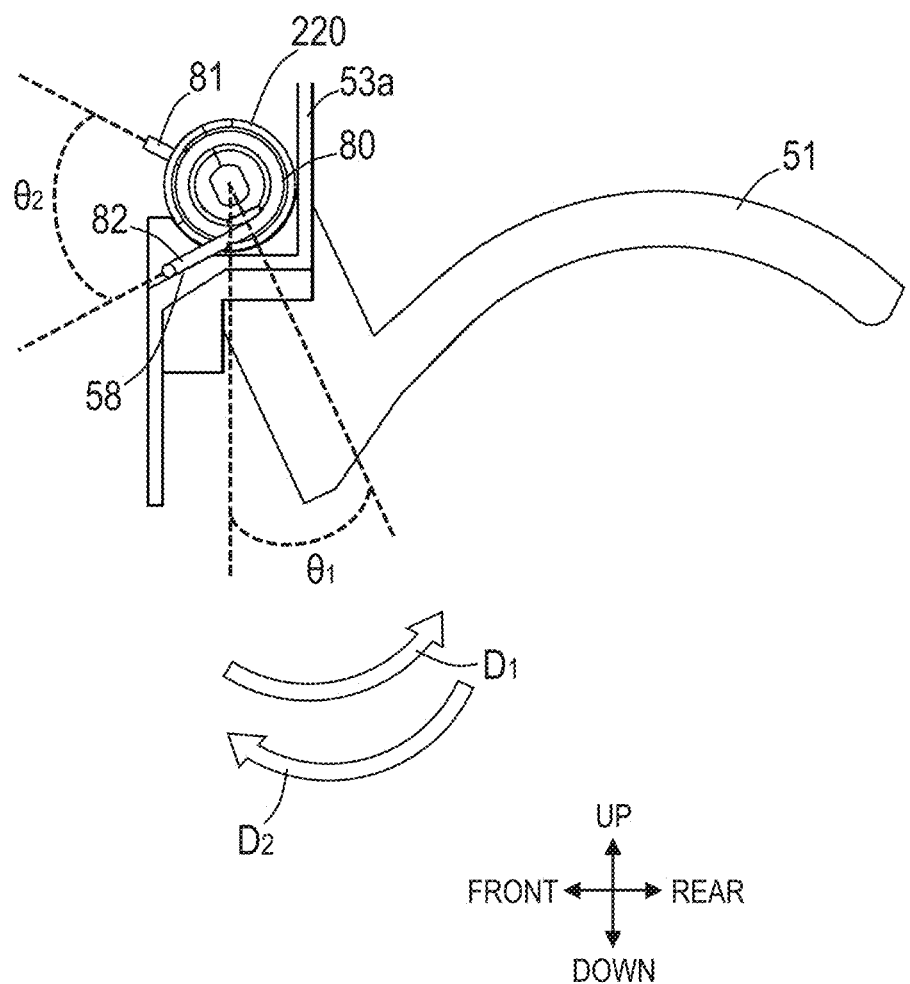
FIG. 12 is a view showing the second torsion spring 80 and the stopper 58 when the first rotation angle $\theta_1$ of the accelerator lever 51 is the predetermined rotation angle $\theta_a$ according to a preferred embodiment of the present invention.
Figure 13:
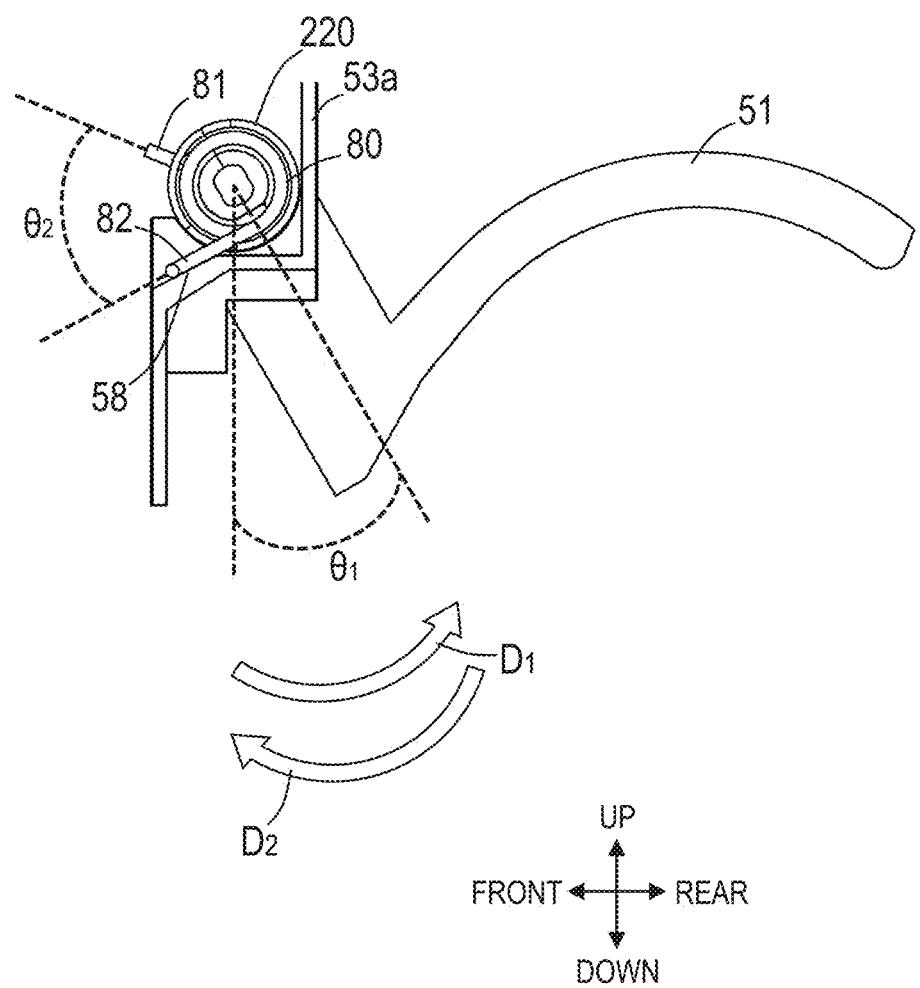
FIG. 13 is a view showing the second torsion spring 80 and the stopper 58 when the first rotation angle $\theta_1$ is greater than the predetermined rotation angle $\theta_a$ according to a preferred embodiment of the present invention.

FIG. 11 to FIG. 13 are views showing the second torsion spring 80 and the stopper 58 as viewed from the left side. FIG. 11 shows the second torsion spring 80 and the stopper 58 when the first rotation angle $\theta_1$ of the accelerator lever 51 is 0 degrees. FIG. 12 shows the second torsion spring 80 and the stopper 58 when the first rotation angle $\theta_1$ is at the predetermined rotation angle $\theta_a$. FIG. 13 shows the second torsion spring 80 and stopper 58 when the first rotation angle $\theta_1$ is greater than the predetermined rotation angle $\theta_a$.

Figure 14:
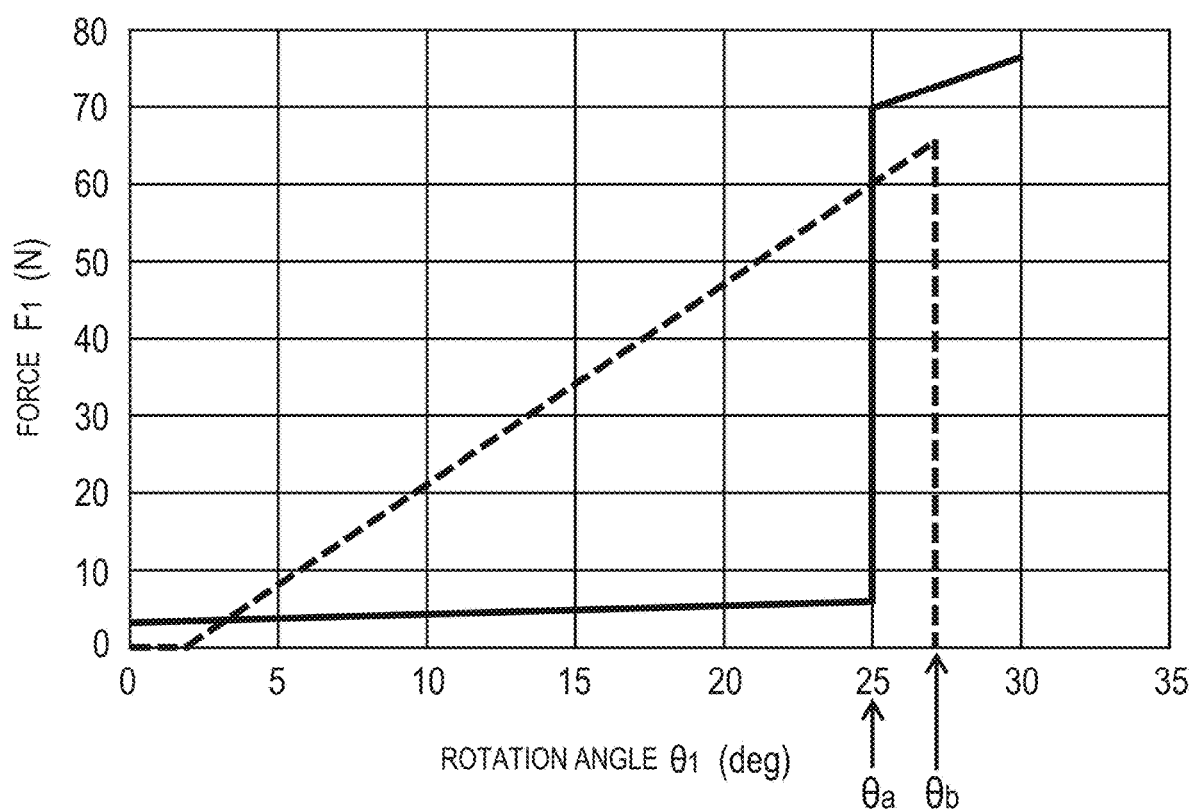
FIG. 14 is a graph showing the relationship between the first rotation angle $\theta_1$ of the accelerator lever 51 and a force $F_1$ needed for the caregiver to move the accelerator lever 51 in a first rotation direction $D_1$ according to a preferred embodiment of the present invention.

FIG. 14 is a graph showing the relationship between the first rotation angle $\theta_1$ of the accelerator lever 51 and the amount of force required for the caregiver to move the accelerator lever 51 in the first rotation direction $D_1$. The horizontal axis of the graph shown in FIG. 14 shows the first rotation angle $\theta_1$ of the accelerator lever 51. The vertical axis shows the force $F_1$ required for the caregiver to move the accelerator lever 51 in the first rotation direction $D_1$. The solid line in the graph shows the force $F_1$ required for the caregiver to move the accelerator lever 51 in the first rotation direction $D_1$. The dashed line in the graph shows the rotation speed of the electric motors 25L and 25R. In the example shown in FIG. 14, the range of movement of the accelerator lever 51 is from 0 degrees to about 30 degrees. As an example, the predetermined rotation angle $\theta_a$ is about 25 degrees.

When the accelerator lever 51 in the neutral position is operated by the caregiver, the accelerator lever 51 rotates in the first rotation direction $D_1$. The processor 111 performs a control to increase the rotation speed of the electric motors 25L and 25R in response to an increase in the first rotation angle $\theta_1$ of the accelerator lever 51. In order to decrease the travel speed of the electric wheelchair 1, the caregiver can loosen the hand gripping the accelerator lever 51 to decrease the first rotation angle $\theta_1$, thus lowering the rotation speed of the electric motors 25L and 25R.

In the example shown in FIG. 14, when the first rotation angle $\theta_1$ is between 0 degrees and about 2 degrees, the processor 111 does not rotate the electric motors 25L and 25R. This prevents the electric motors 25L and 25R from starting when the accelerator lever 51 is slightly rotated against the intention of the caregiver.

As shown in FIG. 9 and FIG. 12, when the first rotation angle $\theta_1$ reaches the predetermined rotation angle $\theta_a$, the arm portion 82 of the second torsion spring 80 contacts the stopper 58. When the first rotation angle $\theta_1$ is equal to or greater than the predetermined rotation angle $\theta_a$, the second torsion spring 80 applies the second elastic force to the accelerator lever 51. When the first rotation angle $\theta_1$ is equal to or greater than the predetermined rotation angle $\theta_a$, the first elastic force of the first torsion spring 70 and the second elastic force of the second torsion spring 80 are both applied to the accelerator lever 51, and the magnitude of the force $F_1$ required for the caregiver to move the accelerator lever 51 increases rapidly.

In the present preferred embodiment, the processor 111 performs a control to stop the electric motors 25L and 25R upon detecting that the first rotation angle $\theta_1$ is equal to or greater than the predetermined rotation angle $\theta_b$ (the first predetermined rotation angle). The predetermined rotation angle $\theta_b$ is an angle greater than the predetermined rotation angle $\theta_a$. The predetermined rotation angle $\theta_b$ is, for example, about 2 degrees to about 5 degrees greater than the predetermined rotation angle $\theta_a$, but is not limited thereto. In the example shown in FIG. 14, the predetermined rotation angle $\theta_a$ is about 27 degrees. When the first rotation angle $\theta_1$ is equal to or greater than the predetermined rotation angle $\theta_b$, the processor 111 performs a control to stop the electric motors 25L and 25R.

Thus, the caregiver can stop the electric motors 25L and 25R only by increasing the amount of operation of the accelerator lever 51. It is possible to stop the electric wheelchair 1 without having to return the accelerator lever 51 to the neutral position, thus improving the convenience for the caregiver.

When the first rotation angle $\theta_1$ of the accelerator lever 51 is equal to or greater than the predetermined rotation angle $\theta_a$, the second torsion spring 80 applies the second elastic force to the accelerator lever 51, thus rapidly increasing the magnitude of the force required for the caregiver to move the accelerator lever 51. This can prevent the electric motors 25L and 25R from stopping when the first rotation angle $\theta_1$ becomes equal to or greater than the predetermined rotation angle $\theta_b$ against the intention of the caregiver.

The predetermined rotation angle $\theta_b$ at which the electric motors 25L and 25R are stopped is greater than the predetermined rotation angle $\theta_a$ at which the second torsion spring 80 starts to apply the second elastic force to the accelerator lever 51. By not stopping the electric motors 25L and 25R at the predetermined rotation angle $\theta_a$, it is possible to prevent the electric motors 25L and 25R from stopping against the intention of the caregiver.

As described above, when the first rotation angle $\theta_1$ of the accelerator lever 51 is equal to or greater than the predetermined rotation angle $\theta_a$, the magnitude of the force required for the caregiver to move the accelerator lever 51 increases rapidly. Thus, the caregiver can recognize that the operating position of the accelerator lever 51 at which the electric motors 25L and 25R stop is close. If the caregiver does not wish to stop the electric wheelchair 1, the caregiver can continue to drive the electric wheelchair 1 by not moving the accelerator lever 51 further in the first rotation direction $D_1$. If the caregiver wishes to stop the electric wheelchair 1, the caregiver can stop the electric motors 25L and 25R by moving the accelerator lever 51 further in the first rotation direction $D_1$.

In the present preferred embodiment, the first torsion spring 70 is used as an elastic member to generate a force in the direction of returning the accelerator lever 51 to the neutral position. By passing the rotation shaft 52 of the accelerator lever 51 through the inside of the coil portion 73 of the first torsion spring 70, the space can be shared between the first torsion spring 70 and the rotation shaft 52, thus reducing the space to be reserved to accommodate the elastic member. The second torsion spring 80 is used as an elastic member to apply the second elastic force to the accelerator lever 51 when the first rotation angle $\theta_1$ is equal to or greater than the predetermined rotation angle $\theta_a$. By passing the rotation shaft 52 of the accelerator lever 51 through the inside of the coil portion 83 of the second torsion spring 80, the space can be shared between the second torsion spring 80 and the rotation shaft 52, thus reducing the space to be reserved to accommodate the elastic member. Thus, it is possible to increase the degree of freedom in arranging other components of the motor control system 100, and also to reduce the size of the motor control system 100.

The spring constant of the second torsion spring 80 may be greater than the spring constant of the first torsion spring 70. Thus, it is possible to increase the second elastic force applied by the second torsion spring 80 to the accelerator lever 51, and to prevent the first rotation angle $\theta_1$ from becoming equal to or greater than the predetermined rotation angle $\theta_b$ and stopping the electric motors 25L and 25R against the intention of the caregiver. For example, by increasing the wire diameter of the wire material of the second torsion spring 80 or by using a harder wire material, it is possible to increase the spring constant of the second torsion spring 80 while keeping the size of the second torsion spring 80 small.

By using a double torsion spring having two coil portions 83 as the second torsion spring 80, it is possible to increase the second elastic force applied to the accelerator lever 51. Since the stress applied to the second torsion spring 80 can be distributed between the two coil portions 83, it is possible to increase the durability of the second torsion spring 80 even when the second elastic force is large.

Note that the second torsion spring 80 may be a single torsion spring. If the second torsion spring 80 is a single torsion spring, a plurality of second torsion springs 80 may be provided.

As described using FIG. 6 and FIG. 7, the arm portion 81 and the arm portion 82 of the second torsion spring 80 are supported by the support members 210 and 220. The support members 210 and 220 support the arm portion 81 and the arm portion 82 with the second torsion spring 80 twisted by a predetermined amount in advance in the direction in which the second torsion spring 80 twists in response to the rotation of the accelerator lever 51 in the first rotation direction $D_1$. For example, the second torsion spring 80 is twisted by a predetermined amount in advance in the direction in which the coil portion 83 of the second torsion spring 80 is wound.

The angle between the arm portion 81 and the arm portion 82 is $\theta_2$ as viewed in a side view. The angle $\theta_2$ (FIG. 11) when the accelerator lever 51 is in the neutral position is smaller than the angle $\theta_2$ when the load on the second torsion spring 80 is zero.

By twisting the second torsion spring 80 by a predetermined amount in advance, a large elastic force can be applied to the accelerator lever 51 from the stage where the second torsion spring 80 starts to apply the second elastic force to the accelerator lever 51. Thus, it is possible to rapidly increase the magnitude of the force required for the caregiver to move the accelerator lever 51.

For example, the magnitude of the torque for the first rotation angle $\theta_1$ to exceed the predetermined rotation angle $\theta_a$ can be about 10 to about 12 times greater than the torque for the first rotation angle $\theta_1$ to be the predetermined rotation angle $\theta_a$. By rapidly increasing the magnitude of the torque for the first rotation angle $\theta_1$ to exceed the predetermined rotation angle $\theta_a$, it is possible to prevent the electric motors 25L and 25R from stopping against the intention of the caregiver.

Figure 15:
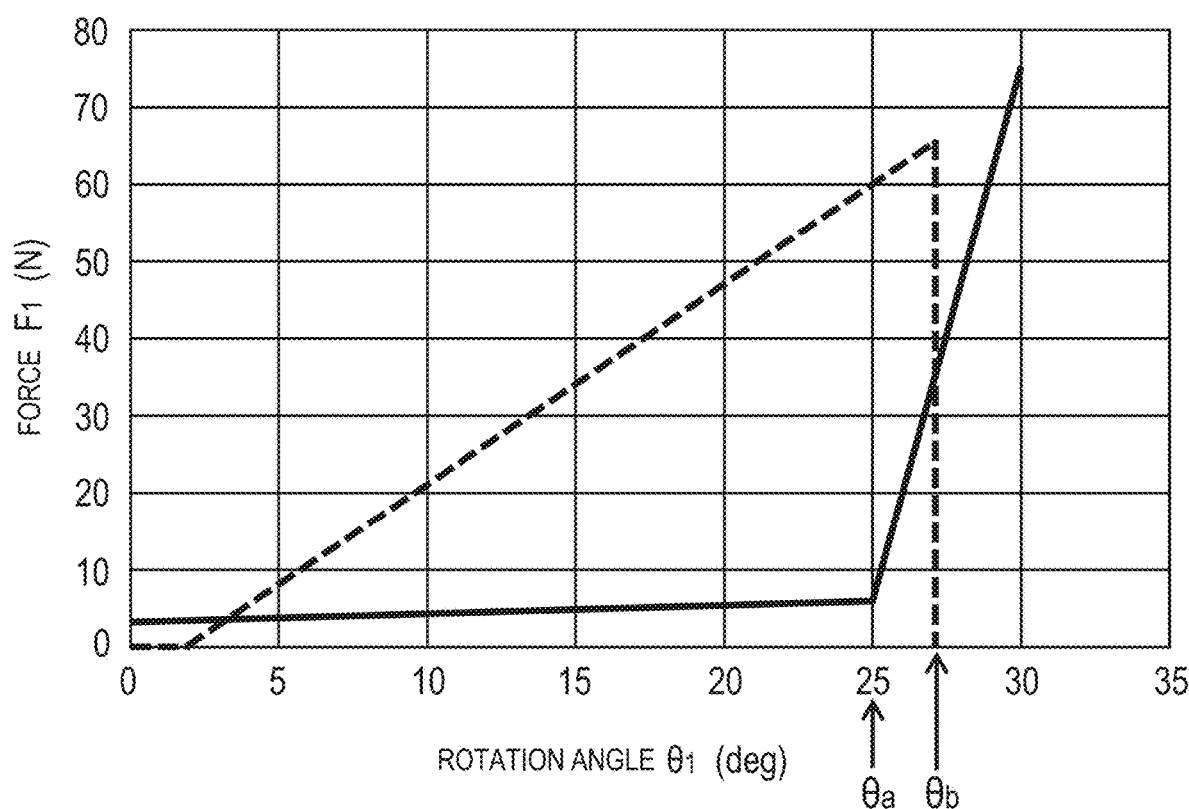
FIG. 15 is a graph showing the relationship between the first rotation angle $\theta_1$ and the force $F_1$ in a state where the second torsion spring 80 is not twisted in advance according to a preferred embodiment of the present invention.

Note that the support members 210 and 220 may support the arm portion 81 and the arm portion 82 while the second torsion spring 80 is not pre-twisted. FIG. 15 is a graph showing the relationship between the first rotation angle $\theta_1$ and the force $F_1$ in a preferred embodiment in which the second torsion spring 80 is not pre-twisted. Even in such a preferred embodiment, it is possible to prevent the electric motors 25L and 25R from stopping when the first rotation angle $\theta_1$ becomes equal to or greater than the predetermined rotation angle $\theta_b$ against the intention of the caregiver.

Next, a variation of the mechanism by which the first torsion spring 70 and the second torsion spring 80 apply an elastic force to the accelerator lever 51 will be described.

Figure 16:
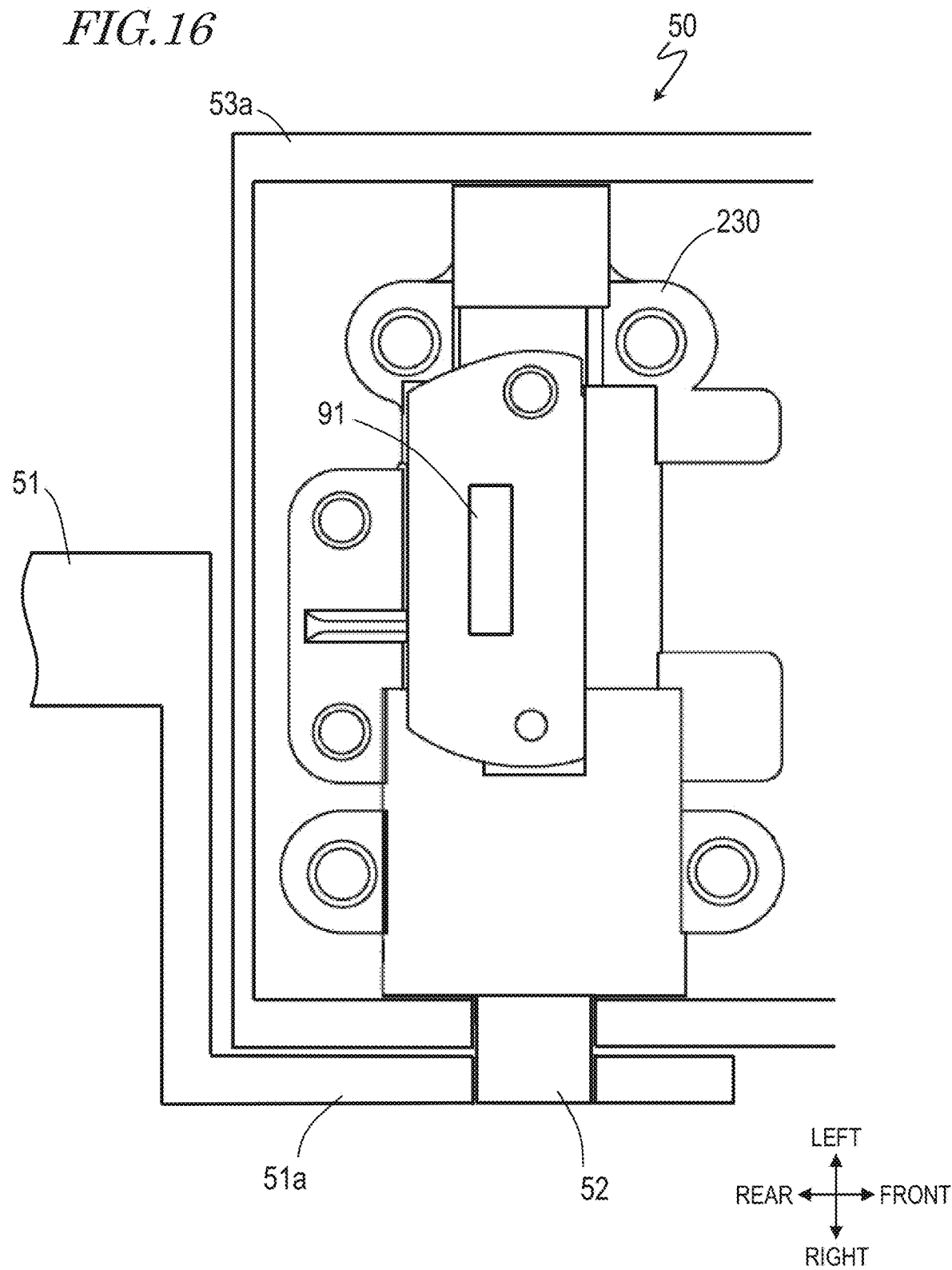
FIG. 16 is a view showing a portion of the inside of the operation unit 50 according to a preferred embodiment of the present invention.

FIG. 16 is a view showing a portion of the inside of the operation unit 50 as viewed from above. In the example shown in FIG. 16, a case 230 is provided in the first housing 53a. The case 230 accommodates the rotation shaft 52, the first torsion spring 70, the second torsion spring 80, the magnet 92 and the support members 210 and 220. The angle sensor 91 is provided in the case 230.

Figure 17:
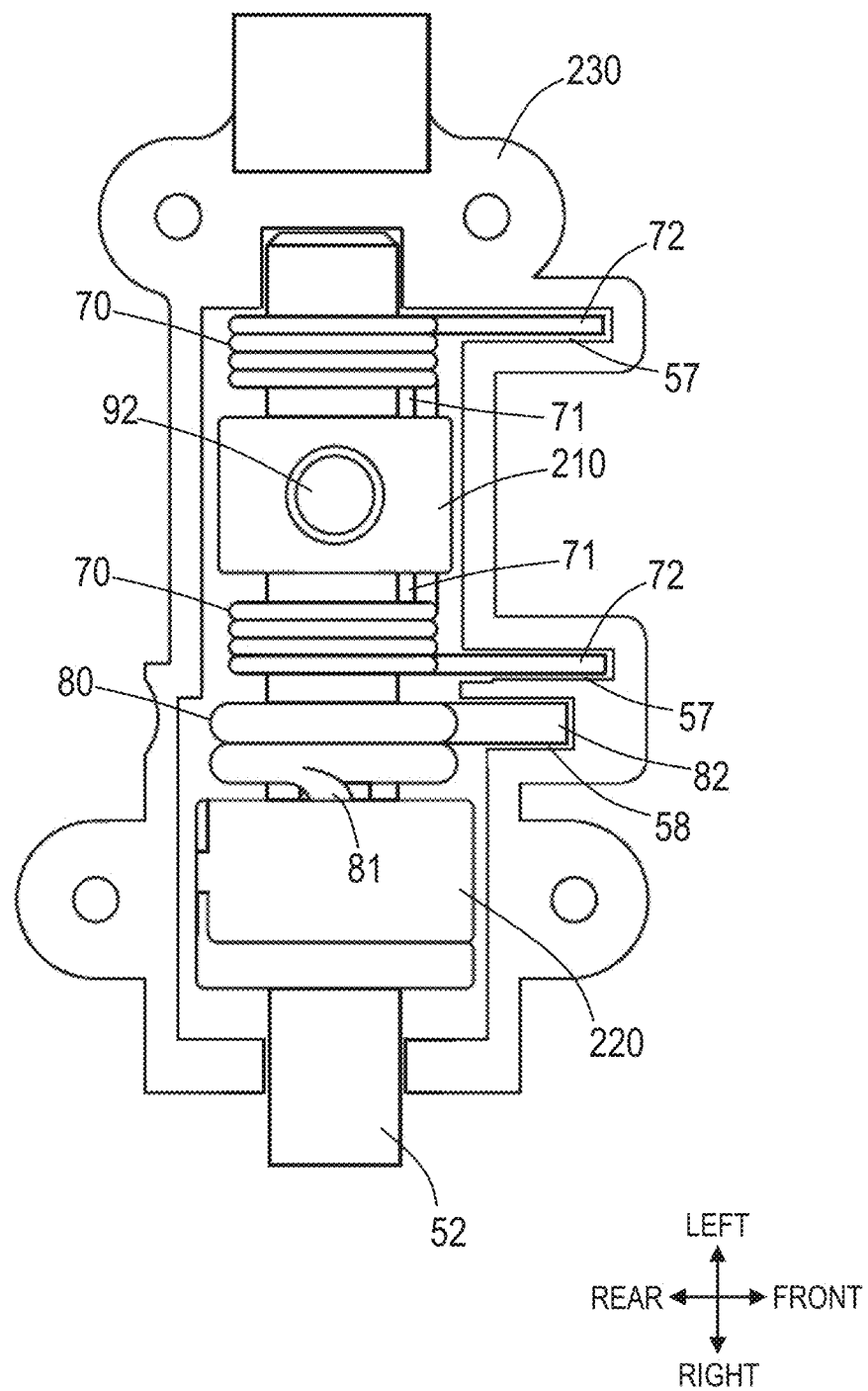
FIG. 17 is a view showing a portion of the inside of a case 230 as viewed from above according to a preferred embodiment of the present invention.

FIG. 17 is a view showing a portion of the inside of the case 230 as viewed from above. In the example shown in FIG. 17, the operation unit 50 includes two first torsion springs 70. The second torsion spring 80 is a single torsion spring.

The rotation shaft 52 is rotatably supported by the case 230. The support members 210 and 220 are provided on the rotation shaft 52. Similar to the above description, the rotation shaft 52 and the support members 210 and 220 have a fastening structure that prevents misalignment of the accelerator lever 51 in the rotation direction.

The arm portion 71 of the first torsion spring 70 is supported by the support member 210. The case 230 is provided with the stopper 57 that contacts the arm portion 72 to prevent movement of the arm portion 72. The support member 210 is provided with the magnet 92.

The arm portion 81 of the second torsion spring 80 is supported by the support member 220. The stopper 58 is provided in the case 230 to limit the range of movement of the arm portion 82 in conjunction with the rotation of the accelerator lever 51. When the first rotation angle $\theta_1$ of the accelerator lever 51 is smaller than the predetermined rotation angle $\theta_a$, the stopper 58 does not contact the arm portion 82 and does not prevent the movement of the arm portion 82. When the first rotation angle $\theta_1$ is equal to or greater than the predetermined rotation angle $\theta_a$, the stopper 58 contacts the arm portion 82 and prevents the movement of the arm portion 82 in conjunction with the rotation of the accelerator lever 51.

The base portion 51a of the accelerator lever 51 is attached to the right end portion of the rotation shaft 52. In the example shown in FIG. 16, the base portion 51a is attached to only one of the opposite end portions of the rotation shaft 52. Also in the preferred embodiment shown in FIG. 6 and FIG. 7, the base portion 51a may be attached to only one of the opposite end portions of the rotation shaft 52.

Also in the preferred embodiment shown in FIG. 16 and FIG. 17, effects are achieved similar to those of the preferred embodiments described above.

While the processor 111 performs the control to stop the electric motors 25L and 25R when the first rotation angle $\theta_1$ is equal to or greater than the predetermined rotation angle $\theta_b$ in the above description, the processors 111 and 121 may perform the same control in cooperation with each other. In this case, for example, the processor 121 sends a command to the processor 111 to stop the motors when the calculated first rotation angle $\theta_1$ is equal to or greater than the predetermined rotation angle $\theta_b$. Upon receiving the command, the processor 111 stops the electric motors 25L and 25R.

The angle sensor 91 is not limited to a magnetic sensor, but may be a potentiometer, for example.

The base portion 51a of the accelerator lever 51 is not limited to a U-letter shape. For example, as shown in FIG. 16, the base portion 51a may be attached to only one of the opposite end portions of the rotation shaft 52. The base portion 51a may be attached to the center portion of the rotation shaft 52 in the left-right direction.

The electric wheelchair 1 may be an electric power-assisted wheelchair in which an electric motor assists a human's hands pedaling the handrims.

Next, a preferred embodiment will be described that includes two angle sensors to output a signal in accordance with the rotation angle of the accelerator lever 51.

Figure 18:
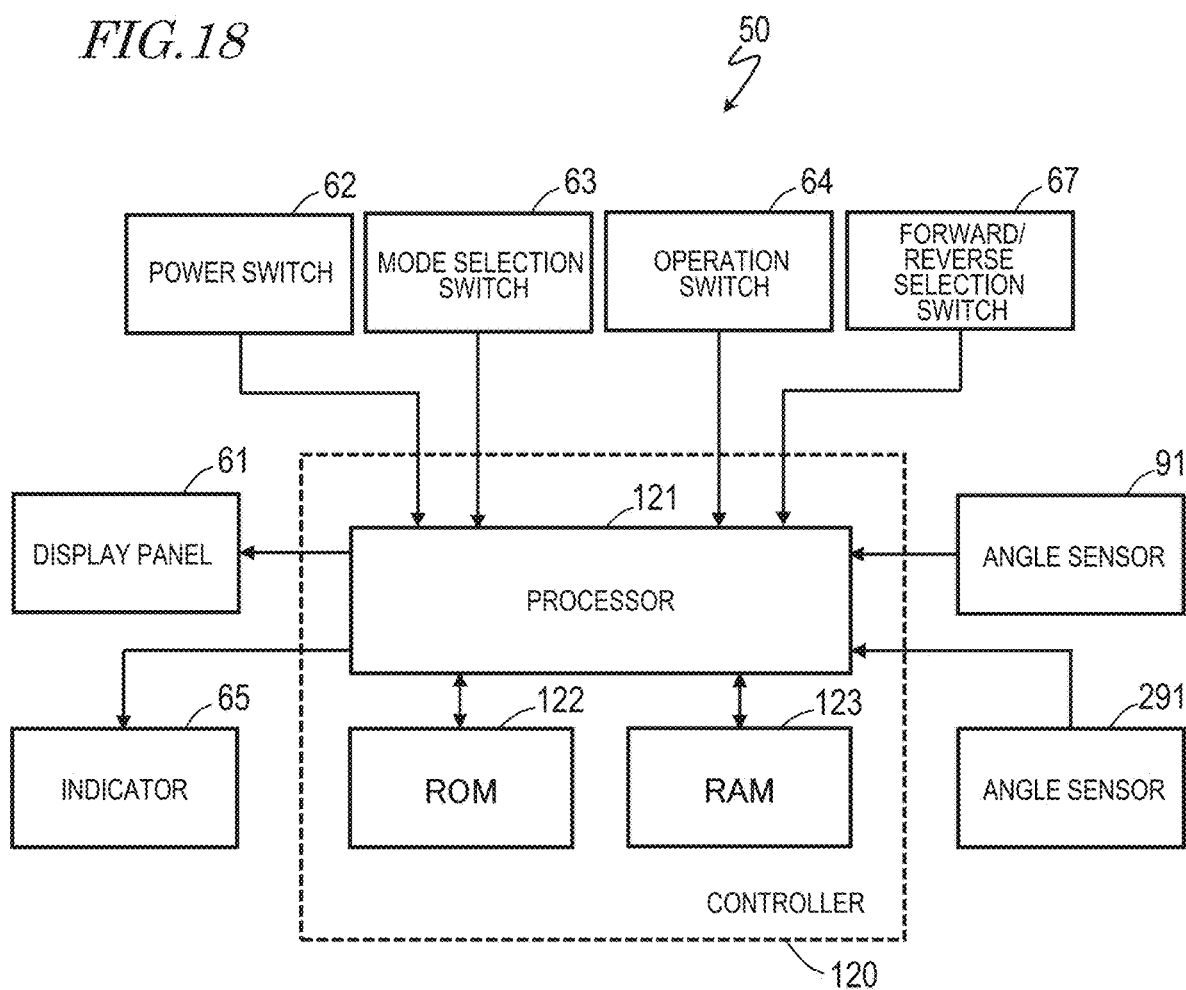
FIG. 18 is a block diagram showing a hardware configuration of the operation unit 50 according to a preferred embodiment of the present invention.

FIG. 18 is a block diagram showing the hardware configuration of the operation unit 50. The operation unit 50 shown in FIG. 18 further includes an angle sensor 291 in addition to the angle sensor 91.

Similar to the angle sensor 91, the angle sensor 291 is, for example, a magnetic sensor and is provided in the first housing 53a. The support member 210 or 220 is provided with a magnet that applies a magnetic field to the angle sensor 291. The angle sensor 291 is not limited to a magnetic sensor and may be a potentiometer, for example. The angle sensor 91 may be referred to as the first angle sensor and the angle sensor 291 may be referred to as the second angle sensor.

FIG. 19 to FIG. 24 are graphs showing the control of the electric motors 25L and 25R using the angle sensor 91 and the angle sensor 291. The horizontal axis of the graphs shown in FIG. 19 to FIG. 24 represents the first rotation angle $\theta_1$ of the accelerator lever 51. The vertical axis represents the detected values of the angle sensors 91 and 291.

Figure 19:
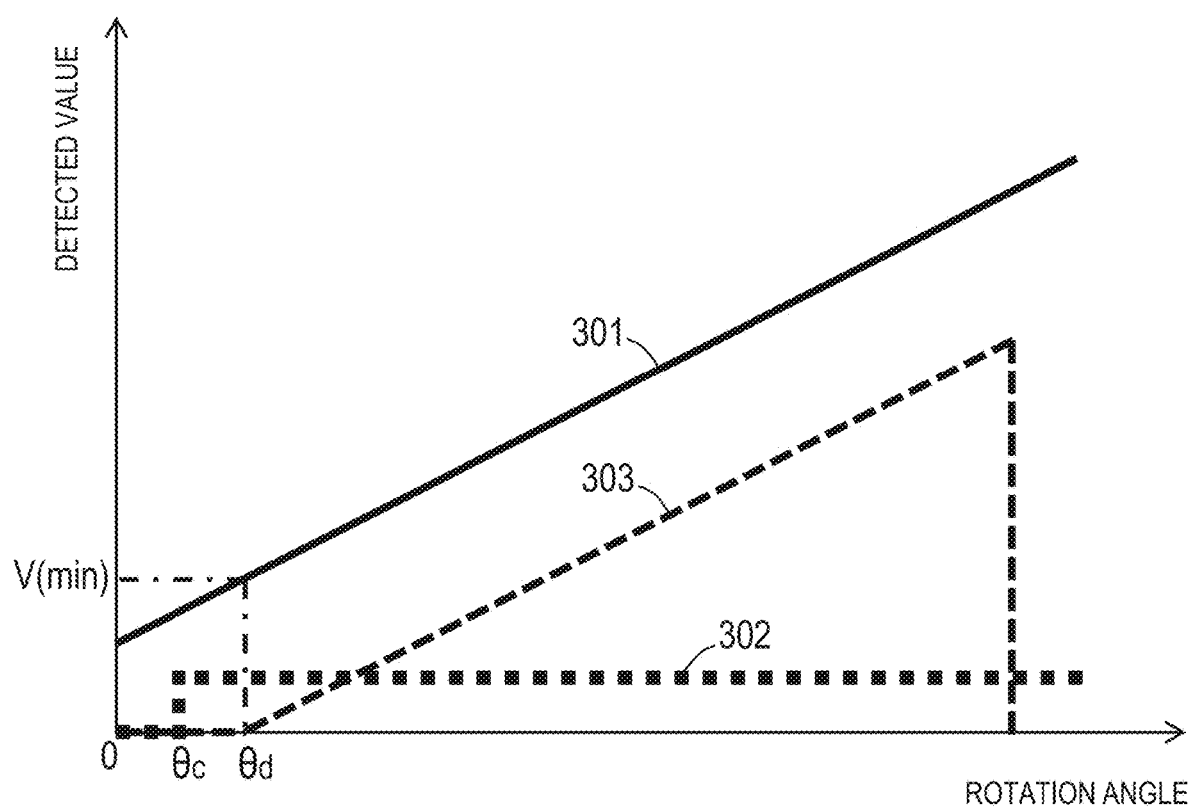
FIG. 19 is a graph showing the control of electric motors 25L and 25R using an angle sensor 91 and an angle sensor 291 according to a preferred embodiment of the present invention.

The controller 120 performs an AD conversion, or the like, on the output signal of the first angle sensor 91 and converts it into a numerical value that gradually changes in accordance with the change in the first rotation angle $\theta_1$ of the accelerator lever 51. The solid line in FIG. 19 shows the detected value 301 obtained by converting the output signal of the first angle sensor 91.

The controller 120 performs an AD conversion, or the like, on the output signal of the second angle sensor 291 and converts it into a binary detected value represented by 0's and 1's. The dotted line in FIG. 19 shows the detected value 302 obtained by converting the output signal of the second angle sensor 291. The binary detected value 302, for example, indicates "0" when the first rotation angle $\theta_1$ is less than $\theta_c$ and "1" when the first rotation angle $\theta_1$ is equal to or greater than $\theta_c$. The rotation angle $\theta_c$ is a value greater than 0 degrees. The dashed line in FIG. 19 shows the rotation speed command value 303 of the electric motors 25L and 25R. A conversion method other than AD conversion may be used to generate the detected values 301 and 302 from the output signals of the angle sensors 91 and 291.

When the detected value 301 of the first angle sensor 91 is less than V (min), the processor 111 (FIG. 3) does not rotate the electric motors 25L and 25R. The rotation angle when the detected value 301 is V (min) is $\theta_d$. $\theta_d$ may be greater than $\theta_c$.

When the first rotation angle $\theta_1$ is equal to or greater than $\theta_d$ and the detected value 301 is equal to or greater than V (min), the processor 111 performs a control to increase the rotation speed of the electric motors 25L and 25R in response to the increase in the first rotation angle $\theta_1$.

Figure 20:
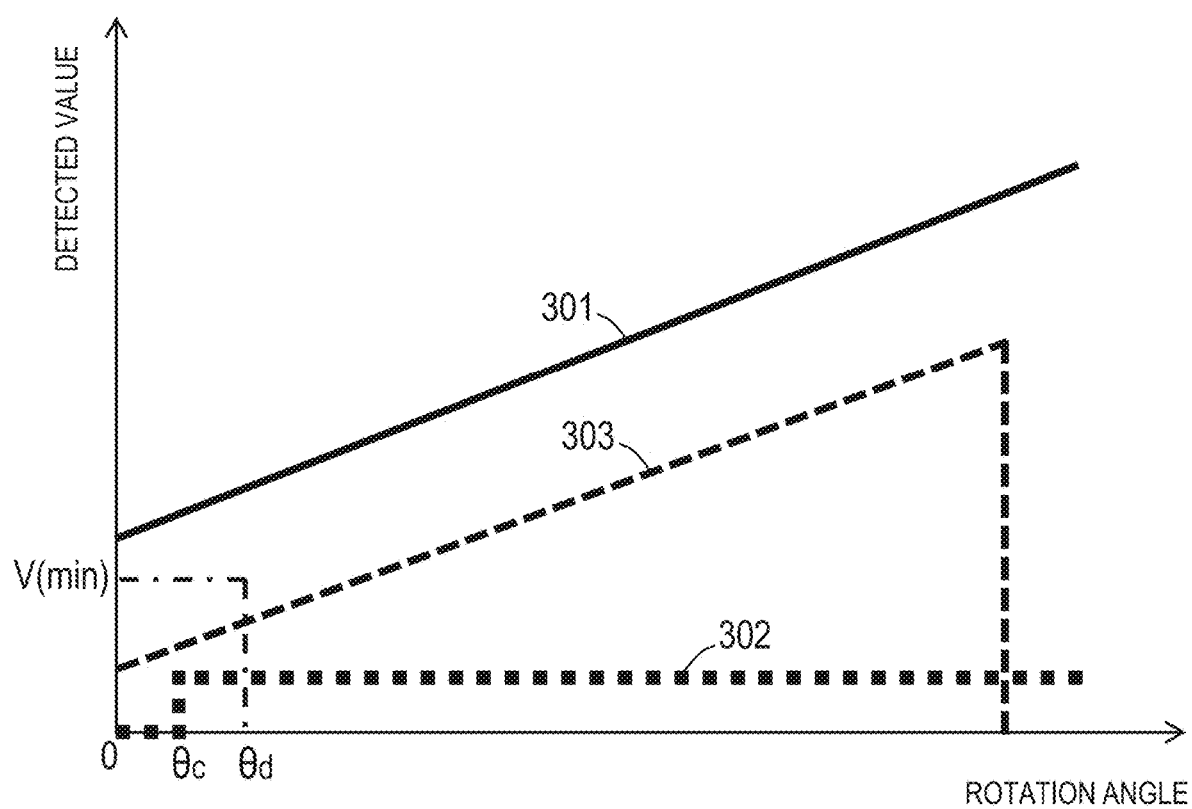
FIG. 20 is a graph showing a state where a detected value 301 is equal to or greater than V (min) when the first rotation angle $\theta_1$ is 0 degrees in the operation unit 50 according to a preferred embodiment of the present invention.
Figure 21:
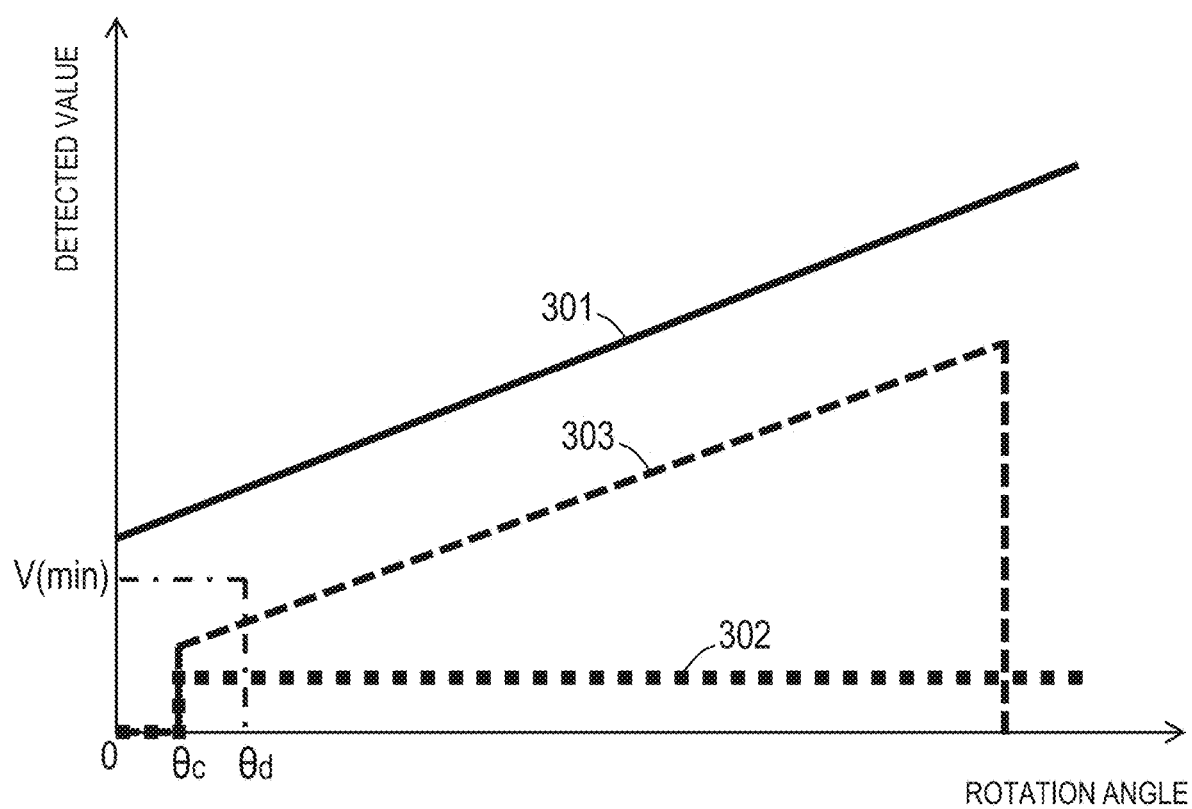
FIG. 21 is a graph showing the control in which the electric motors 25L and 25R are not rotated when a detected value 302 of the second angle sensor 291 indicates "0" according to a preferred embodiment of the present invention.

FIG. 20 shows a state where a problem occurs in the operation unit 50, and the detected value 301 is equal to or greater than V (min) when the first rotation angle $\theta_1$ is 0 degrees. In the present preferred embodiment, the processor 111 performs a control of not rotating the electric motors 25L and 25R, irrespective of the magnitude of the detected value 301, when the detected value 302 of the second angle sensor 291 indicates "0". Therefore, even if a problem as shown in FIG. 20 occurs, the electric motors 25L and 25R can be stopped when the first rotation angle $\theta_1$ is less than $\theta_c$. FIG. 21 shows a control of not rotating the electric motors 25L and 25R, irrespective of the magnitude of the detected value 301, when the detected value 302 of the second angle sensor 291 indicates "0". When the first rotation angle $\theta_1$ is less than $\theta_c$ and the detected value 302 indicates "0", the rotation speed of the electric motors 25L and 25R is set to zero.

If a problem occurs in the operation unit 50, the processor 121 uses the indicator 65 and/or the display panel 61 to inform the caregiver that a problem has occurred.

Figure 22:
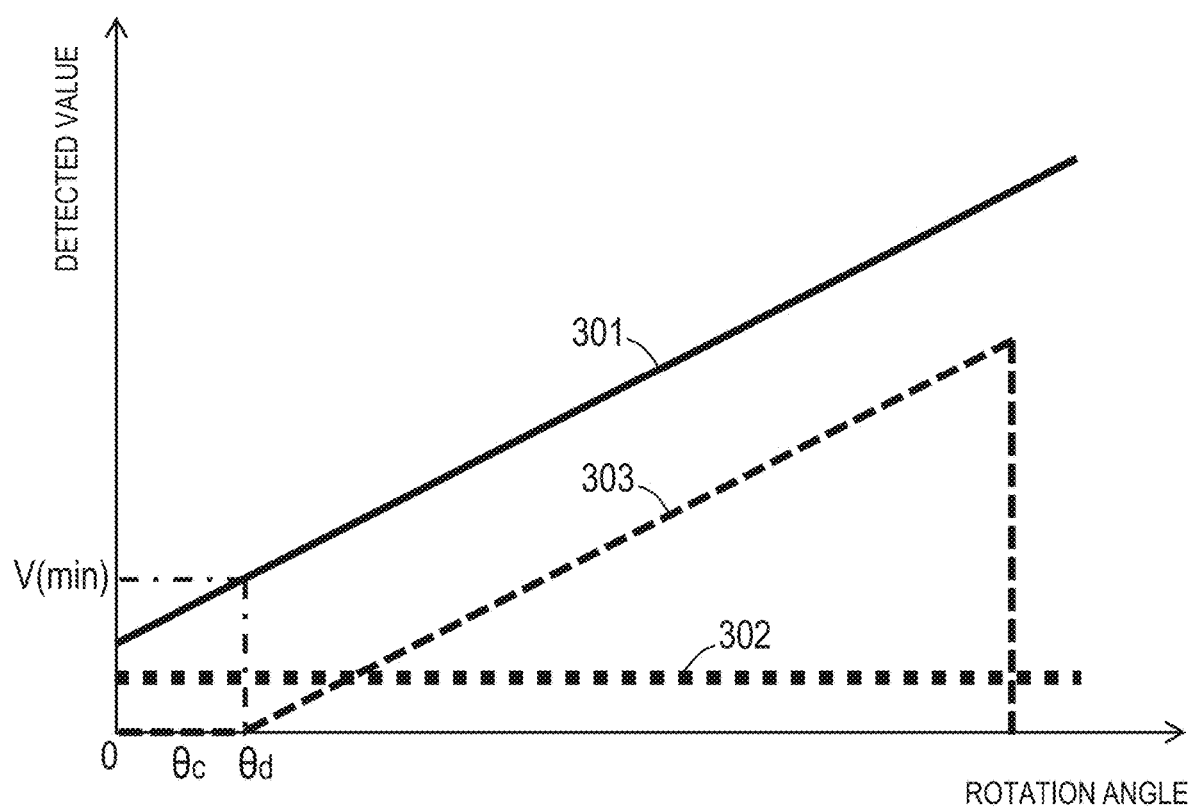
FIG. 22 is a graph showing a state where the detected value 302 of the second angle sensor 291 constantly indicates "1" according to a preferred embodiment of the present invention.

FIG. 22 shows a state where a problem has occurred in which the detected value 302 of the second angle sensor 291 constantly indicates "1". Even when the detected value 301 of the first angle sensor 91 is the value when the first rotation angle $\theta_1$ is 0 degrees, if the detected value 302 of the second angle sensor 291 indicates "1", the processor 121 determines that a problem has occurred in the operation unit 50 and notifies the caregiver.

If a problem occurs in which the detected value 302 constantly indicates "1", the detected value 302 indicates "1" immediately after the power of the electric wheelchair 1 is switched from OFF to ON. In such a case, the processor 121 does not activate the electric motors 25L and 25R but determines that a problem has occurred in the operation unit 50 to notify the caregiver.

If the caregiver has already operated the accelerator lever 51 at the timing when the power is turned ON, the detected value 302 indicates "1" since immediately after the power is turned ON. In such a case, the processor 121 does not activate the electric motors 25L and 25R. When the caregiver, having been informed by the operation unit 50, removes the hand from the accelerator lever 51, the detected value 302 returns to "0" and it is possible to return to a normal operating state.

Figure 23:
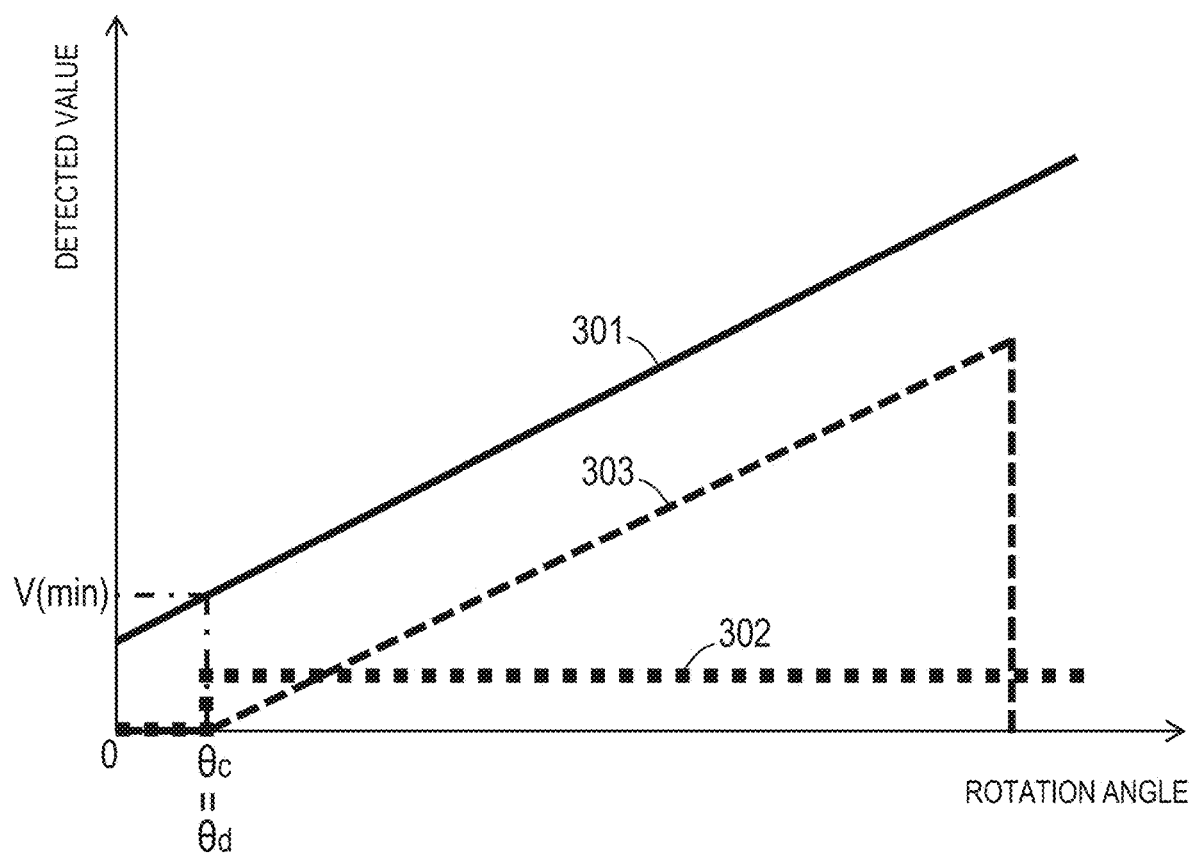
FIG. 23 is a graph showing another example of the control of the electric motors 25L and 25R using the angle sensor 91 and the angle sensor 291 according to a preferred embodiment of the present invention.
Figure 24:
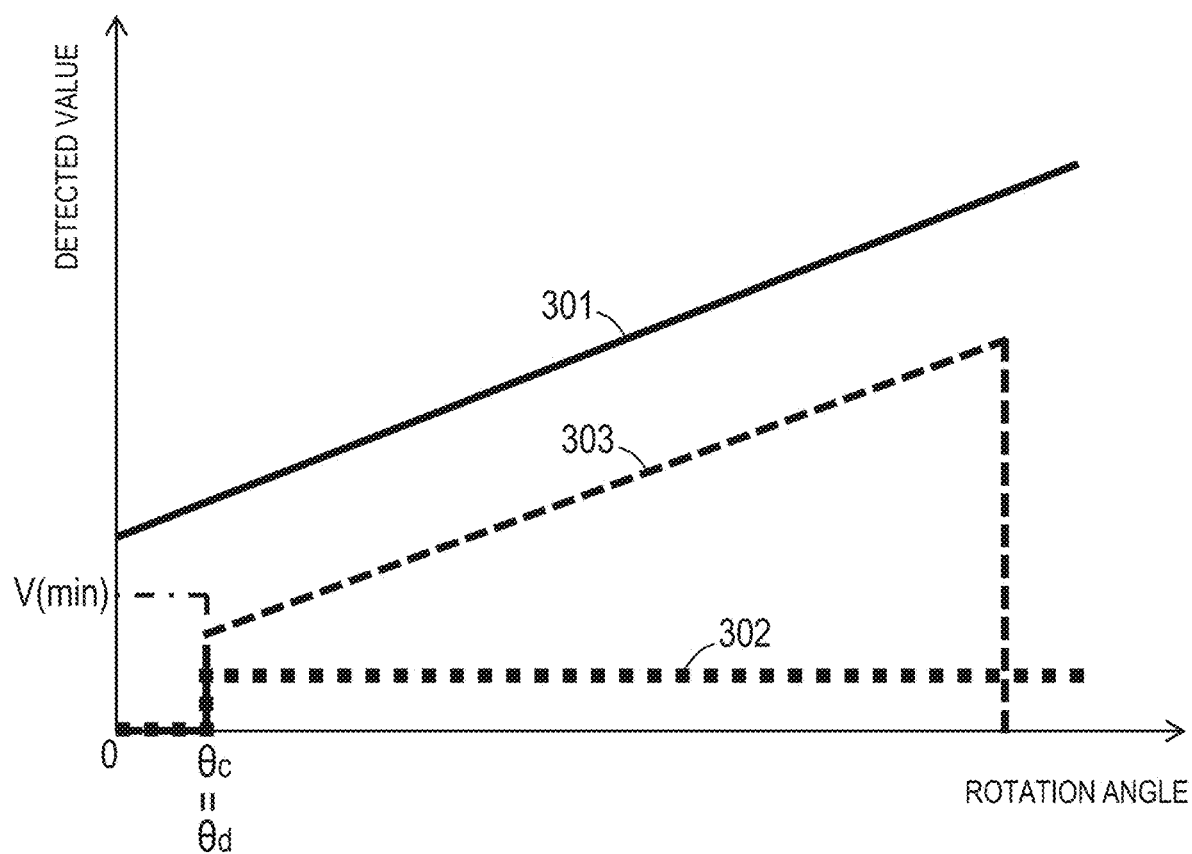
FIG. 24 is a graph showing the control in which the electric motors 25L and 25R are not rotated when the detected value 302 of the second angle sensor 291 indicates "0" according to a preferred embodiment of the present invention.

FIG. 23 and FIG. 24 are graphs showing another example of a control of the electric motors 25L and 25R using the angle sensor 91 and the angle sensor 291. In the example shown in FIG. 23, the rotation angle $\theta_c$ at which the value of the detected value 302 switches and the rotation angle $\theta_d$ corresponding to V (min) are of the same magnitude. FIG. 24 shows a state where a problem occurs in the operation unit 50 in the control shown in FIG. 23, and the detected value 301 is equal to or greater than V (min) when the first rotation angle $\theta_1$ is 0 degrees. Also in this case, the processor 111 performs a control of not rotating the electric motors 25L and 25R, irrespective of the magnitude of the detected value 301, when the detected value 302 indicates "0". Thus, the electric motors 25L and 25R can be stopped when the first rotation angle $\theta_1$ is less than $\theta_c$. The processor 121 informs the caregiver that a problem has occurred in the operation unit 50.

FIG. 25 is a graph showing a preferred embodiment in which the detected value 301 is set to V (min) when the first rotation angle $\theta_1$ is 0 degrees. In the preferred embodiment described above, the electric motors 25L and 25R are started after rotating the accelerator lever 51 over a predetermined angle. In the example shown in FIG. 25, the electric motors 25L and 25R are activated since immediately after the accelerator lever 51 starts rotating from the neutral position.

Illustrative preferred embodiments of the present invention have been described above.

A motor control system 100 for use in an electric vehicle 1 according to a preferred embodiment of the present invention includes an accelerator lever 51 operable by a user, a housing 53 to rotatably support the accelerator lever 51, an angle sensor 91 to output a signal in accordance with a rotation angle of the accelerator lever 51, a controller 110 configured or programmed to controls electric motors 25L and 25R to generate a drive power to drive the electric vehicle 1, and to perform a control such that a rotation speed of the electric motors 25L and 25R is increased in response to an increase in a first rotation angle $\theta_1$, which is a rotation angle in a first rotation direction $D_1$ of the accelerator lever 51 from a reference position of the accelerator lever 51; and a first torsion spring 70 including a coil portion 73 inside of which a rotation shaft 52 of the accelerator lever 51 extends to apply a first elastic force in a second rotation direction $D_2$ in an opposite direction to the first rotation direction $D_1$ to the accelerator lever 51, wherein the controller 110 is configured or programmed to perform a control to stop the electric motors 25L and 25R upon detecting that the first rotation angle $\theta_1$ is equal to or greater than a first predetermined rotation angle $\theta_b$.

According to a preferred embodiment of the present invention, the electric motors 25L and 25R are stopped when the first rotation angle $\theta_1$ of the accelerator lever 51 is equal to or greater than the first predetermined rotation angle $\theta_b$. The user can stop the electric motors 25L and 25R by simply increasing the amount of operation of the accelerator lever 51. The user can stop the electric vehicle 1 without returning the accelerator lever 51 to the reference position (e.g., the neutral position), thus improving convenience for the user.

The first torsion spring 70 is used as an elastic member to generate a force in the direction of returning the accelerator lever 51 to the reference position. By passing the rotation shaft 52 of the accelerator lever 51 through the coil portion 73 of the first torsion spring 70, the space can be shared between the first torsion spring 70 and the rotation shaft 52, thus reducing the space to be reserved to accommodate the elastic member. Thus, it is possible to increase the degree of freedom in arranging the other components of the motor control system 100, and also to reduce the size of the motor control system 100.

In a preferred embodiment, the motor control system 100 further includes a second torsion spring 80 including a coil portion 83 inside of which the rotation shaft 52 of the accelerator lever 51 extends to apply a second elastic force in the second rotation direction $D_2$ to the accelerator lever 51, wherein where a second predetermined rotation angle $\theta_a$ is a predetermined value greater than 0 degrees and less than the first predetermined rotation angle $\theta_b$, the second torsion spring 80 does not apply the second elastic force to the accelerator lever 51 when the first rotation angle $\theta_1$ is less than the second predetermined rotation angle $\theta_a$; and applies the second elastic force to the accelerator lever 51 when the first rotation angle $\theta_1$ is equal to or greater than the second predetermined rotation angle $\theta_a$.

When the first rotation angle $\theta_1$ of the accelerator lever 51 is equal to or greater than the second predetermined rotation angle $\theta_a$, the second torsion spring 80 applies the second elastic force to the accelerator lever 51, thus rapidly increasing the magnitude of the force required for the user to move the accelerator lever 51. This can prevent the electric motors 25L and 25R from stopping when the first rotation angle $\theta_1$ becomes equal to or greater than the first predetermined rotation angle $\theta_b$ against the intention of the user.

The first predetermined rotation angle $\theta_b$ at which the electric motors 25L and 25R are stopped is greater than the second predetermined rotation angle $\theta_a$ at which the second torsion spring 80 starts to apply the second elastic force to the accelerator lever 51. By not stopping the electric motors 25L and 25R at the second predetermined rotation angle $\theta_a$, it is possible to prevent the electric motors 25L and 25R from stopping against the intention of the user.

As described above, when the first rotation angle $\theta_1$ of the accelerator lever 51 is equal to or greater than the second predetermined rotation angle $\theta_a$, the magnitude of the force required for the user to move the accelerator lever 51 increases rapidly. Thus, the user can recognize that the operation position of the accelerator lever 51 at which the electric motors 25L and 25R stop is close. If the user does not wish to stop the electric vehicle 1, the user can continue to drive the electric vehicle 1 by not moving the accelerator lever 51 further in the first rotation direction $D_1$. If the user wishes to stop the electric vehicle 1, the user can stop the electric motors 25L and 25R by moving the accelerator lever 51 further in the first rotation direction $D_1$.

The second torsion spring 80 is used as an elastic member to apply the second elastic force to the accelerator lever 51 when the first rotation angle $\theta_1$ is equal to or greater than the second predetermined rotation angle $\theta_a$. By passing the rotation shaft 52 of the accelerator lever 51 through the inside of the coil portion 83 of the second torsion spring 80, the space can be shared between the second torsion spring 80 and the rotation shaft 52, thus reducing the space to be reserved to accommodate the elastic member. Thus, it is possible to increase the degree of freedom in arranging other components of the motor control system 100, and also to reduce the size of the motor control system 100.

In a preferred embodiment, the spring constant of the second torsion spring 80 may be greater than the spring constant of the first torsion spring 70.

It is possible to increase the second elastic force applied by the second torsion spring 80 to the accelerator lever 51, and to prevent the first rotation angle $\theta_1$ from becoming equal to or greater than the first predetermined rotation angle $\theta_b$ and stopping the electric motors 25L and 25R against the intention of the user.

For example, by increasing the wire diameter of the wire material of the second torsion spring 80 or by using a harder wire material, it is possible to increase the spring constant of the second torsion spring 80 while keeping the size of the second torsion spring 80 small.

In a preferred embodiment, the second torsion spring 80 includes a first arm portion 81 and a second arm portion 82 extending from the coil portion 83 of the second torsion spring 80; the motor control system 100 includes support members 210 and 220 provided on the rotation shaft 52 of the accelerator lever 51 to support the first arm portion 81 so that the first arm portion 81 moves in conjunction with rotation of the accelerator lever 51, and a stopper 58 to limit a range of movement of the second arm portion 82 in conjunction with the rotation of the accelerator lever 51, and the stopper does not contact the second arm portion 82 when the first rotation angle $\theta_1$ is less than the second predetermined rotation angle $\theta_a$, and contacts the second arm portion 82, thus limiting movement of the second arm portion 82 in conjunction with the rotation of the accelerator lever 51, when the first rotation angle $\theta_1$ is equal to or greater than the second predetermined rotation angle $\theta_a$.

When the first rotation angle $\theta_1$ of the accelerator lever 51 is equal to or greater than the second predetermined rotation angle $\theta_a$, the second elastic force can be applied from the second torsion spring 80 to the accelerator lever 51.

In a preferred embodiment, the support members 210 and 220 support the first arm portion 81 and the second arm portion 82 with the second torsion spring 80 twisted by a predetermined amount in advance in a direction in which the second torsion spring 80 twists in response to the rotation of the accelerator lever 51 in the first rotation direction $D_1$.

By twisting the second torsion spring 80 by a predetermined amount in advance, a large elastic force can be applied to the accelerator lever 51 from the stage where the second torsion spring 80 starts to apply the second elastic force to the accelerator lever 51. Thus, it is possible to rapidly increase the magnitude of the force required for the user to move the accelerator lever 51.

In a preferred embodiment, a magnitude of a torque for the first rotation angle $\theta_1$ to exceed the second predetermined rotation angle $\theta_a$ is about 10 to about 12 times greater than a torque for the first rotation angle $\theta_1$ to be the second predetermined rotation angle $\theta_a$.

By rapidly increasing the magnitude of the torque for the first rotation angle $\theta_1$ to exceed the second predetermined rotation angle $\theta_a$, it is possible to prevent the electric motors 25L and 25R from stopping against the intention of the user.

In a preferred embodiment, the motor control system 100 may further include fastening structures 214, 224 and 254 that prevent misalignment between the rotation shaft 52 of the accelerator lever 51 and the support members 210 and 220 in the rotation direction of the accelerator lever 51.

It is possible to prevent misalignment between the rotation shaft 52 of the accelerator lever 51 and the second torsion spring 80 supported by the support members 210 and 220, and the magnitude of the first rotation angle $\theta_1$ at which the second torsion spring 80 starts applying the second elastic force to the accelerator lever 51 can be made constant.

In a preferred embodiment, the second torsion spring 80 is a double torsion spring, the double torsion spring includes two coil portions 83 arranged side by side along a first direction (the left-right direction); the double torsion spring includes two arm portions extending from opposite end portions of the double torsion spring 80 in the first direction that corresponds to one arm portion of the first arm portion 81 and the second arm portion 82; and another arm portion that corresponds to the other of the first arm portion 81 and the second arm portion 82 is located between the two coil portions 83 in the first direction and links together the two coil portions 83.

By using a double torsion spring having two coil portions 83 as the second torsion spring 80, it is possible to increase the second elastic force applied to the accelerator lever 51. Since the stress applied to the second torsion spring 80 can be distributed between the two coil portions 83, it is possible to increase the durability of the second torsion spring 80 even when the second elastic force is large.

In a preferred embodiment, the first predetermined rotation angle $\theta_b$ is about 2 degrees to about 5 degrees greater than the second predetermined rotation angle $\theta_a$.

The electric motors 25L and 25R are stopped when the first rotation angle $\theta_1$ becomes equal to the first predetermined rotation angle $\theta_b$, which is slightly larger than the second predetermined rotation angle $\theta_a$ at which the second torsion spring 80 starts applying the second elastic force to the accelerator lever 51. By not stopping the electric motors 25L and 25R when the first rotation angle $\theta_1$ becomes equal to the second predetermined rotation angle $\theta_a$, it is possible to prevent the electric motors 25L and 25R from stopping against the intention of the user.

In a preferred embodiment, the second predetermined rotation angle $\theta_a$ may be about 20 degrees or more and about 30 degrees or less.

The accelerator lever 51 can be rotated over an angular range for which the user can easily adjust the travel speed of the electric vehicle 1.

In a preferred embodiment, the motor control system 100 further includes the magnet 92 that moves in conjunction with rotation of the accelerator lever 51, wherein the angle sensor 91 may be a magnetic sensor, and may be supported by the housing 53 so as not to move in conjunction with the rotation of the accelerator lever 51.

By using a magnetic sensor, the rotation angle of the accelerator lever 51 can be detected with high accuracy. By using a non-contact magnetic sensor, it is possible to enhance the durability of the angle sensor 91.

The durability of the angle sensor 91 can be enhanced by providing the angle sensor 91 with an extended electric wire so that it does not move in conjunction with the rotation of the accelerator lever 51.

In a preferred embodiment, the base portion 51a of the accelerator lever 51 may be connected to opposite end portions of the rotation shaft 52.

The first torsion spring 70 and the second torsion spring 80 can be arranged in the region enclosed by the base portion 51a of the accelerator lever 51.

The neutral position of the accelerator lever 51 can be defined in the rotation direction of the accelerator lever 51 as the base portion 51a of the accelerator lever 51 contacts the housing 53.

In a preferred embodiment, the housing 53 may have a hole 54 through which the handlebar 45a of the electric vehicle 1 penetrates.

Where the motor control system 100 is installed on the electric vehicle 1 afterwards, it is possible to maintain the position of the grip 46 originally intended on the electric vehicle 1, and the user can operate the accelerator lever 51 while holding the grip 46.

A drive unit 10 according to a preferred embodiment of the present invention includes the motor control system 100 described above, and the electric motors 25L and 25R to generate a drive power to drive the electric vehicle 1.

By installing the drive unit 10 on the electric vehicle 1, it is possible to improve the convenience of the user.

An electric vehicle 1 according to a preferred embodiment of the present invention includes the drive unit 10 described above.

Thus, it is possible to provide the electric vehicle 1 that is highly convenient for the user.

In a preferred embodiment, the electric vehicle 1 may be an electric wheelchair.

Thus, it is possible to provide an electric wheelchair that is highly convenient for the caregiver.

Preferred embodiments of the present invention are particularly useful in the field of electric vehicles.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor control system for use in an electric vehicle, the motor control system comprising:
   an accelerator lever operable by a user;
   a housing to rotatably support the accelerator lever;
   an angle sensor to output a signal in accordance with a rotation angle of the accelerator lever;
   a controller configured or programmed to control an electric motor to generate a drive power to drive the electric vehicle, and to perform a control such that a rotation speed of the electric motor is increased in response to an increase in a first rotation angle, which is a rotation angle in a first rotation direction of the accelerator lever from a reference position of the accelerator lever; and
   a first torsion spring including a coil portion inside of which a rotation shaft of the accelerator lever extends to apply a first elastic force in a second rotation direction in an opposite direction to the first rotation direction to the accelerator lever; wherein
   the controller is configured or programmed to perform a control to stop the electric motor upon detecting that the first rotation angle is equal to or greater than a first predetermined rotation angle.

2. The motor control system according to claim 1, further comprising:
   a second torsion spring including a coil portion inside of which the rotation shaft of the accelerator lever extends to apply a second elastic force in the second rotation direction to the accelerator lever; wherein
   a second predetermined rotation angle is a predetermined value greater than 0 degrees and less than the first predetermined rotation angle; and
   the second torsion spring:
      does not apply the second elastic force to the accelerator lever when the first rotation angle is less than the second predetermined rotation angle; and
      applies the second elastic force to the accelerator lever when the first rotation angle is equal to or greater than the second predetermined rotation angle.

3. The motor control system according to claim 2, wherein a spring constant of the second torsion spring is greater than a spring constant of the first torsion spring.

4. The motor control system according to claim 2, wherein the second torsion spring includes a first arm portion and a second arm portion extending from the coil portion of the second torsion spring;
   the motor control system further comprises:
      a support provided on the rotation shaft of the accelerator lever to support the first arm portion so that the first arm portion moves in conjunction with rotation of the accelerator lever; and
      a stopper to limit a range of movement of the second arm portion in conjunction with the rotation of the accelerator lever; and
   the stopper:
      does not contact the second arm portion when the first rotation angle is less than the second predetermined rotation angle; and
      contacts the second arm portion to limit movement of the second arm portion in conjunction with the rotation of the accelerator lever when the first rotation angle is equal to or greater than the second predetermined rotation angle.

5. The motor control system according to claim 4, wherein the support supports the first arm portion and the second arm portion with the second torsion spring twisted by a predetermined amount in advance in a direction in which the second torsion spring twists in response to the rotation of the accelerator lever in the first rotation direction.

6. The motor control system according to claim 4, wherein a magnitude of a torque for the first rotation angle to exceed the second predetermined rotation angle is about 10 to about 12 times greater than a torque for the first rotation angle to be the second predetermined rotation angle.

7. The motor control system according to claim 4, further comprising a fastener to prevent misalignment between the rotation shaft of the accelerator lever and the support in a rotation direction of the accelerator lever.

8. The motor control system according to claim 4, wherein the second torsion spring is a double torsion spring;
   the double torsion spring includes two coil portions arranged side by side along a first direction;
   the double torsion spring includes two arm portions extending from opposite end portions of the double torsion spring in the first direction that corresponds to one arm portion of the first arm portion and the second arm portion; and another arm portion that corresponds to the other of the first arm portion and the second arm portion is located between the two coil portions in the first direction and links together the two coil portions.

9. The motor control system according to claim 2, wherein the first predetermined rotation angle is about 2 degrees to about 5 degrees greater than the second predetermined rotation angle.

10. The motor control system according to claim 2, wherein the second predetermined rotation angle is about 20 degrees or more and about 30 degrees or less.

11. The motor control system according to claim 1, further comprising:

a magnet to move in conjunction with rotation of the accelerator lever; wherein the angle sensor is a magnetic sensor, and is supported by the housing so as not to move in conjunction with the rotation of the accelerator lever.

12. The motor control system according to claim 1, wherein a base portion of the accelerator lever is connected to opposite end portions of the rotation shaft.

13. The motor control system according to claim 1, wherein the housing includes a hole through which a handlebar of the electric vehicle is to penetrate.

14. A drive unit comprising:

the motor control system according to claim 1; and an electric motor to generate a drive power to drive the electric vehicle.

15. An electric vehicle comprising:

the drive unit according to claim 14.

16. The electric vehicle according to claim 15, wherein the electric vehicle is an electric wheelchair.

* * * * *